United States Patent
Yang

(10) Patent No.: US 8,605,057 B2
(45) Date of Patent: Dec. 10, 2013

(54) REFLECTION DETECTION APPARATUS, DISPLAY APPARATUS, ELECTRONIC APPARATUS, AND REFLECTION DETECTION METHOD

(75) Inventor: Ying Bao Yang, Kanagawa (JP)

(73) Assignee: Sony Corporation, Tokyo (JP)

( * ) Notice: Subject to any disclaimer, the term of this patent is extended or adjusted under 35 U.S.C. 154(b) by 893 days.

(21) Appl. No.: 12/658,978

(22) Filed: Feb. 18, 2010

(65) Prior Publication Data

US 2010/0220245 A1    Sep. 2, 2010

(30) Foreign Application Priority Data

Feb. 27, 2009    (JP) ................. P2009-045514

(51) Int. Cl.
*H04N 5/66* (2006.01)

(52) U.S. Cl.
USPC ........... 345/175; 345/156; 345/173; 345/176; 178/18.09

(58) Field of Classification Search
USPC ................ 345/175, 176, 156, 173; 178/18.09
See application file for complete search history.

(56) References Cited

U.S. PATENT DOCUMENTS

| | | | |
|---|---|---|---|
| 2006/0244693 A1 | 11/2006 | Yamaguchi et al. | |
| 2007/0046625 A1* | 3/2007 | Yee | 345/156 |
| 2007/0152985 A1* | 7/2007 | Ostergaard et al. | 345/176 |
| 2008/0062149 A1* | 3/2008 | Baruk | 345/175 |
| 2009/0033638 A1 | 2/2009 | Yamaguchi et al. | |

FOREIGN PATENT DOCUMENTS

JP    2006-301864 A    11/2006

* cited by examiner

*Primary Examiner* — Amare Mengistu
*Assistant Examiner* — Jennifer Zubajlo
(74) *Attorney, Agent, or Firm* — Sony Corporation

(57) ABSTRACT

A reflection detection apparatus includes: a light-emitting surface; a detection light output portion to obliquely emit detection light from an emission area as a part of the light-emitting surface; a plurality of light-receiving devices to selectively receive, as reflected detection light, the detection light that is emitted to an external object from the emission area and enters the light-emitting surface with a predetermined angle after being reflected by the external object; and a height detection portion to obtain a height of a spot at which the detection light is reflected by the external object using positional information of the light-receiving device which has received the reflected detection light and positional information of the emission area, the height being a distance from the light-emitting surface.

19 Claims, 13 Drawing Sheets

REFLECTION DETECTION APPARATUS, DISPLAY APPARATUS, ELECTRONIC APPARATUS, AND REFLECTION DETECTION METHOD

CROSS-REFERENCE TO RELATED APPLICATION

The present application claims priority from Japanese Patent Application No. JP 2009-045514 filed in the Japanese Patent Office on Feb. 27, 2009, the entire content of which is incorporated herein by reference.

BACKGROUND OF THE INVENTION

1. Field of the Invention

The present invention relates to a reflection detection apparatus that externally emits detection light from a light-emitting surface (display surface of display apparatus) and receives the reflected detection light by a plurality of light-receiving devices, and a reflection detection method. The present invention also relates to a display apparatus and an electronic apparatus including the reflection detection function.

2. Description of the Related Art

A reflection detection generally involves irradiating light onto an object and detecting presence/absence of the objected by detecting reflected light.

However, not only for detecting the presence/absence of an object, but the reflection detection is also used for a position detection for detecting an in-plane position of an object in some cases.

For example, there is known a display device including an optical position detection function, in which a light-receiving device for detecting a designated position is incorporated into a display panel (see, for example, Japanese Patent Application Laid-open No. 2006-301864; hereinafter, referred to as Patent Document 1).

In the technique disclosed in Patent Document 1, a sensor (light-receiving device) that senses light is provided at a part of pixels on a screen or all the pixels on the screen, on a display panel such as a liquid crystal panel and an organic EL panel. By associating a detection signal from the sensor with positional information of a pixel at which the sensor is provided, an in-plane position of an object such as a finger and a pen that has touched a panel surface can be detected. Light that is irradiated onto the object and detected by the sensor is invisible light such as infrared (IR) light. The use of invisible light enables a position detection to be performed even in a screen area in black display or the like.

On the other hand, as a method of measuring a distance between a light-emitting surface of detection light and an object, there is known a triangulation method that is carried out for automatic focusing of a camera apparatus, and the like.

SUMMARY OF THE INVENTION

In a general distance measurement method, however, since light needs to be aimed within a certain range, the distance measurement is not always available at any position within a large plane. Thus, a display apparatus having a built-in touch panel or touch sensor may not be able to measure a distance (height) from a display surface using the triangulation method.

In view of the circumstances as described above, there is a need for a position detection apparatus capable of measuring a distance (height) from a light-emitting surface.

There is also a need for a display apparatus that has a function of the position detection apparatus and is capable of measuring a distance (height) from a display surface, and an electronic apparatus including the display apparatus.

There is also a need for a position detection method with which a distance (height) from the light-emitting surface can be measured.

According to an embodiment of the present invention, there is provided a position detection apparatus including a light-emitting surface, a detection light output portion, a plurality of light-receiving devices, and a height detection portion.

The detection light output portion obliquely (e.g., at predetermined angle) emits detection light from an emission area as a part of the light-emitting surface. Desirably, the detection light output portion shifts the emission area in one direction within the light-emitting surface.

The plurality of light-receiving devices selectively receive, as reflected detection light, the detection light that is emitted to an external object from the emission area and enters the light-emitting surface with a predetermined angle after being reflected by the external object, and output a light-receiving signal.

The height detection portion obtains, for example, when the light-receiving signal is obtained (before or after shift when shift is performed), a coordinate of an incident position of the reflected detection light from a position (positional information) of the light-receiving device from which the light-receiving signal has been obtained. Further, the height detection portion obtains, using the coordinate and a coordinate of a position (positional information) of the emission area corresponding to the coordinate, a height of a spot at which the detection light is reflected by the external object, the height being a distance from the light-emitting surface.

In the embodiment of the present invention, desirably, the detection light output portion is capable of limiting the emission area within a range in which an emission angle $\theta 1$ of the detection light with respect to the light-emitting surface and an incident angle $\theta 2$ of the reflected detection light with respect to the light-emitting surface can be regarded as equivalent (each of $\theta 1$ and $\theta 2$ can be regarded as a single value), and shifting the emission area in one direction.

In this case, more desirably, the height detection portion obtains a coordinate a2 of the incident position of the reflected detection light in the shift direction and a coordinate a1 of the position of the emission area at a time the coordinate a2 is obtained. Further, the height detection portion obtains, using the obtained two coordinates a1 and a2, the emission angle $\theta 1$, and the incident angle $\theta 2$, a value H corresponding to the height by solving Equation (1) below.

$$H=|a1-a2|*\tan\theta 1*\tan\theta 2/(\tan\theta 1+\tan\theta 2) \qquad (1)$$

In the embodiment of the present invention, desirably, the detection light output portion is capable of outputting as the detection light, from the emission area, two parallel light beams that have tilt angle components in two opposite directions within the light-emitting surface. The detection light output portion is also capable of shifting the emission area in a direction parallel to the two opposite directions.

In this case, more desirably, the height detection portion obtains, for each of the two parallel light beams, a coordinate a2 of the incident position of the reflected detection light in the shift direction and a coordinate a1 of the position of the emission area at a time the coordinate a2 is obtained. Further, the height detection portion obtains, using the obtained two coordinates a1 and a2 and an emission angle $\theta 1$ of the detection light with respect to the light-emitting surface, a value H corresponding to the height by solving Equation (1) below established for each of the two parallel light beams, that is, $$H=|a1-a2|*\tan\theta1*\tan\theta2/(\tan\theta1+\tan\theta2) \quad (1)$$

where an incident angle θ2 of the reflected detection light with respect to the light-emitting surface and the value H corresponding to the height are unknown.

With such a structure, since the emission area of the detection light can be limited to a part of the light-emitting surface of the touch panel or the like that emits planar light having a large area, a correspondence between the light-emitting position and the light-receiving position becomes clear. As a result, it becomes possible to detect a distance (height) to an object by a triangulation method even with the position detection apparatus.

According to another embodiment of the present invention, there is provided a display apparatus including a display surface, a display portion, a plurality of light-receiving devices, and a height detection portion.

The display portion has an image display function for outputting visible light modulated in accordance with an input video signal to an external object from the display surface. The display portion also has a function of obliquely emitting detection light from an emission area as a part of the display surface. In addition, the display portion desirably has a function of shifting the emission area in one direction within the display surface.

The plurality of light-receiving devices selectively receive, as reflected detection light, the detection light that is emitted to the external object from the emission area and enters the light-emitting surface with a predetermined angle after being reflected by the external object, and output a light-receiving signal.

The height detection portion obtains, for example, when the light-receiving signal is obtained (before or after shift when shift is performed), a coordinate of an incident position of the reflected detection light from a position (positional information) of the light-receiving device from which the light-receiving signal has been obtained. Moreover, the height detection portion obtains, using the coordinate and a coordinate of a position (positional information) of the emission area corresponding to the coordinate, a height of a spot at which the detection light is reflected by the external object, the height being a distance from the display surface.

According to another embodiment of the present invention, there is provided an electronic apparatus including a display panel and a circuit portion including a circuit that processes a video to be displayed on the display panel.

The display panel includes the display surface, the display portion, and the plurality of light-receiving devices as in the display apparatus of the embodiment above.

The height detection portion included in the display apparatus of the above embodiment is provided in the display panel or the circuit portion.

According to another embodiment of the present invention, there is provided a position detection method including the following steps.

(1) Light-emitting step of obliquely emitting detection light from an emission area as a part of a display surface (2) Light-receiving step of selectively receiving, as reflected detection light, the detection light that is emitted to an external object from the emission area and enters the display surface with a predetermined angle after being reflected by the external object, and generating a light-receiving signal (3) Scanning step of repeating the light-emitting step while shifting the emission area in one direction within the display surface (4) Height detection step of obtaining, when a received-light amount of a predetermined level or more is obtained from the light-receiving signal generated in the light-receiving step every time the shift is performed, using a coordinate of an incident position of the reflected detection light corresponding to a light-receiving position (positional information) at which the received-light amount has been obtained and a coordinate of a position (positional information) of the emission area corresponding to the coordinate, a height of a spot at which the detection light is reflected by the external object, the height being a distance from the display surface According to the embodiments of the present invention, a position detection apparatus capable of measuring a distance (height) from a light-emitting surface can be provided.

Moreover, a display apparatus that has a function of the position detection apparatus and is capable of measuring a distance (height) from a display surface, and an electronic apparatus including the display apparatus can be provided.

Furthermore, a position detection method with which a distance (height) from the light-emitting surface can be measured can be provided.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, a reflection detection apparatus according to an embodiment of the present invention will be described with reference to the drawings while taking a case where a function of the reflection detection apparatus is realized in a liquid crystal display apparatus as an example. The liquid crystal display apparatus described herein corresponds to an example of a "display apparatus" of the present invention.

Descriptions will be given in the following order.
1. Embodiment
Detailed contents are sectioned into (Panel structure), (Path of infrared light), (Details on structural components), (BL/sensor scan and structure therefor), and (Height detection).
2. Modified examples
2-1. Modified Example 1: Modification on light-receiving device and lens
2-2. Modified Example 2: Modification on detection light output portion

1. Embodiment

Panel Structure

Figure 1:
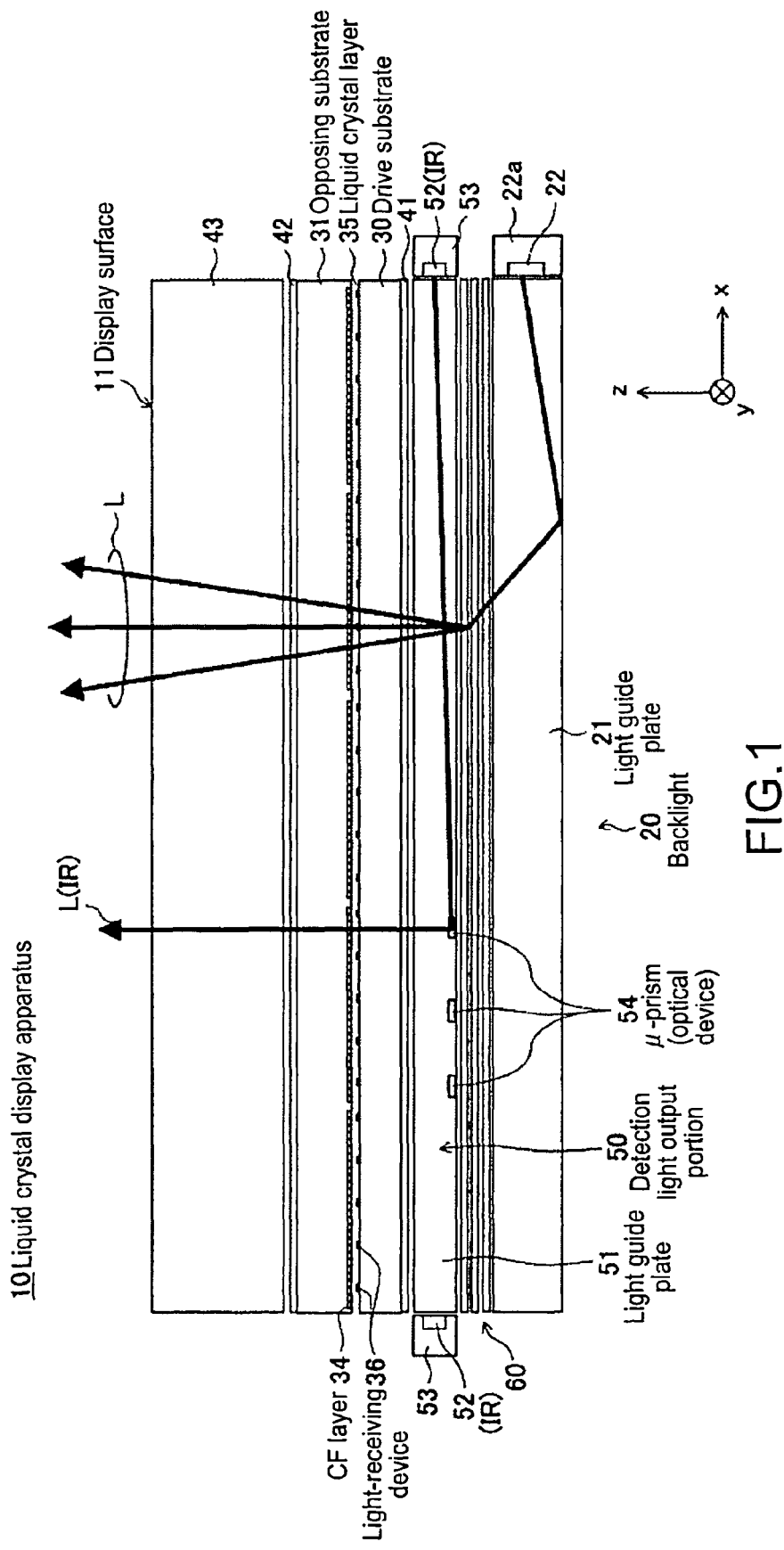
FIG. 1 is a cross-sectional diagram of a panel of a liquid crystal display apparatus according to an embodiment of the present invention.

FIG. 1 is a cross-sectional structural diagram of a panel of a liquid crystal display apparatus. This cross-sectional structure is common to a semi-transmissive panel and a transmissive panel. Moreover, in the cross-sectional diagram of FIG. 1, slashes that indicate a cross section are omitted for a clearer view. The same holds true for other cross sections to be described later.

A liquid crystal display apparatus 10 shown in FIG. 1 includes a display surface 11 as an observation surface on which a video is displayed to be viewed by a user. The display surface 11 refers to a surface (upper surface) of a protective layer 43 as an uppermost layer formed on two substrates (to be described later) constituting a "display portion". Alternatively, in a case where a sheet is additionally attached to the surface of the protective layer 43, an uppermost surface of the sheet becomes the display surface 11.

A backlight 20 is disposed on a most-rearward side on the other side of the display surface 11 of the "display portion".

The backlight 20 includes a light guide plate 21, a light source (hereinafter, referred to as "white-color light source" since white-color LED is used) 22 such as an LED, and a reflection box 22a. The white-color light source 22 enclosed by the reflection box 22a is provided on at least one side surface of the light guide plate 21. The reflection box 22a is a member that prevents LED light from leaking in the periphery of the white-color light source 22 and is provided for improving a light use efficiency.

Although not illustrated in particular, the backlight 20 is connected to an LED drive portion so that light emission of the white-color light source 22 is controlled by the LED drive portion. Moreover, on a back side of the light guide plate 21, a reflection sheet is attached. The backlight 20 is an illumination apparatus dedicated to image display, that is obtained by integrally assembling the components described above.

The display portion includes as two glass substrates a drive substrate 30 on the backlight 20 side and an opposing substrate 31 on the display surface 11 side.

Although not illustrated in detail due to a complication, an electrode and a circuit device in a pixel including a thin-film transistor (TFT), and wirings for a pixel matrix drive are formed on the drive substrate 30. The drive substrate 30 is attached to the opposing substrate 31 so that an internal space is formed via a spacer (not shown). At this time, a surface of the drive substrate 30 on which the circuit device, the electrode, and the wirings are formed is opposed to the opposing substrate 31.

On the opposing substrate 31, a color filter (CF) layer 34 is formed in advance before the attachment of the substrates.

In the cross-sectional structure shown in FIG. 1, the color filter layer 34 is shown inside the opposing substrate 31. The color filter layer 34 is formed in advance on the opposing substrate 31 so as to face the internal space formed by the drive substrate 30, the opposing substrate 31, and the spacer.

Liquid crystal is injected into the internal space between the two substrates from a portion at which the spacer is not formed. When the liquid crystal injection portion is closed thereafter, the liquid crystal is sealed inside the drive substrate 30, the opposing substrate 31, and the spacer, with the result that a liquid crystal layer 35 is formed.

Although not illustrated in detail due to a complication in FIG. 1, a pixel electrode per pixel and a common electrode (not shown) common throughout the pixels are provided adjacent to the liquid crystal layer 35 formed as described above. The two types of electrodes are electrodes for applying a voltage to the liquid crystal layer 35. The two electrodes may sandwich the liquid crystal layer 35 (longitudinal-direction drive mode) or the two electrodes may be laminated in two layers on the drive substrate 30 side (lateral-direction drive mode). In the latter case of laminating the electrodes in two layers, although the electrodes are insulated and separated, the common electrode on the lower layer side imparts an electrical action to the liquid crystal from between pixel electrode patterns that are in contact with the liquid crystal layer 35 on the upper layer side. Therefore, a direction of an electric field becomes a lateral direction in the lateral-direction drive mode. On the other hand, in the former case where the two substrates sandwich the liquid crystal layer 35 in a thickness direction, a direction of an electric field becomes a longitudinal direction (thickness direction).

Irrespective of which drive mode specification the electrodes are arranged in, it is possible to drive the voltage in a matrix in a pixel unit with respect to the liquid crystal layer 35 using the two electrodes. The liquid crystal layer 35 is a functional layer that optically modulates transmission thereof. The liquid crystal layer 35 performs gradation display in accordance with a magnitude of the applied voltage.

As another optical functional layer, a first polarization plate 41 is interposed between the backlight 20 and the drive substrate 30. In addition, a second polarization plate 42 is interposed between the opposing substrate 31 and the display surface.

The protective layer 43 is formed on a surface of the second polarization plate 42 on the display surface 11 side.

In this embodiment, a detection light output portion and white-color optical film 60 are provided between the first polarization plate 41 and the backlight 20.

The detection light output portion 50 is a component that emits "detection light" as light within a wavelength range different from that of display illumination light, for detecting an object. Here, the display illumination light is light of a white-color LED that is within a wavelength range of mainly visible light. On the other hand, the detection light is invisible light such as infrared (IR) light. The detection light may be visible light, but since the visible light is blocked when the liquid crystal layer 35 is driven for black display, the display and detection may be unable to be performed at the same time. Therefore, the detection light is desirably visible light, more desirably infrared light in particular since it is fit for a reflection detection.

The detection light output portion 50 includes a light guide plate 51, a light source such as an infrared LED, and a reflection box 53. The light source such as an infrared LED will hereinafter be referred to as infrared LED 52 (IR).

The infrared LED 52 (IR) enclosed by the reflection box 53 is provided on at least one side surface of the light guide plate 51. The reflection box 53 is a member that prevents LED light from leaking in the periphery of the infrared LED 52 (IR) and is provided for improving a light use efficiency of the detection light.

Although not illustrated in particular, the detection light output portion 50 is connected to the LED drive portion so that light emission of the infrared LED 52 (IR) is controlled by the LED drive portion. Moreover, on a back side of the light guide plate 51, a reflection sheet is attached. The detection light output portion 50 is an illumination apparatus dedicated to a reflection detection, that is obtained by integrally assembling the components described above.

Path of Infrared Light

Next, paths of backlight light and infrared light of the liquid crystal display apparatus 10 structured as described above will be described.

During image display, the white-color light source is lit inside the backlight 20. As a result, light from the white-color light source 22 (display illumination light) enters the light guide plate 21 from one end portion of the light guide plate 21.

The light guide plate 21 is one type of a reflection diffusion plate formed of a transparent material, and light from a point light source such as an LED is gradually diffused to be converted into planar light as it is repeatedly reflected inside the light guide plate 21.

More specifically, part of the light is reflected by a surface of the light guide plate 21 on the upper surface side (display surface side) so that the light returns to the light guide plate 21, and the rest of the light exits the light guide plate 21.

The light that has exited the light guide plate 21 is converted into light diffused to a certain degree while it passes through the white-color optical film 60. The white-color optical film 60 is constituted of multilayer films and has a light diffusion function and a function of changing an optical axis of light to be vertical to the display surface 11.

On the other hand, light needs to be totally reflected by a surface of the light guide plate 21 on the back side so as to prevent the light from leaking. When nothing is provided on the back side, part of the light may try to exit the light guide plate 21. For causing the light that is trying to exit the light guide plate 21 to return to the light guide plate 21, a reflection sheet (not shown) is attached to the light guide plate 21 on the back side. Based on the same idea, the reflection box 22a is provided around the white-color light source 22.

The backlight 20 is structured such that light from the white-color light source 22 is efficiently emitted as illumination light in a front direction by the reflection sheet and the reflection box 22a.

The display illumination light emitted from the backlight 20 and transmitted through the white-color optical film 60 passes through the detection light output portion 50. The white-color optical film 60 is structured such that the display illumination light at this time is practically unaffected by a change of the direction of the optical axis or an attenuation of a light amount.

The display illumination light emitted from the white-color optical film 60 is modulated in the display portion in accordance with a video signal and output from the display surface 11 as image light L.

On the other hand, the infrared light L (IR) output from the infrared LED 52 (IR) expands by being repeatedly reflected inside the light guide plate 51, and a light amount per unit area is equalized. As long as an emission angle from the infrared LED 52 (IR) satisfies reflection conditions at the upper and lower surfaces of the light guide plate 51, the infrared light L (IR) is repeatedly reflected and the light is practically trapped inside the light guide plate 51. In particular, the infrared light L (IR) is totally reflected by the reflection film at the lower surface and prevented from leaking from the side surface by the reflection box 53 and the like.

Details on Structural Components

Though details on structures and the like will be given later, a large number of micro (μ) prisms 54 are arranged as "optical devices" on the light guide plate 51. The μ-prisms 54 are provided so that infrared light L (IR) can be emitted only from portions right above the portions where the μ-prisms 54 are provided. Therefore, depending on a density of the μ-prisms 54 and a distinction between the arrangement area and a non-arrangement area, an emission area of the infrared light L (IR) as seen from the display surface 11 can be made an arbitrary pattern.

An optical path of the infrared light L (IR) from the μ-prisms 54 is bent as shown in FIG. 1 so that the infrared light L (IR) is output from the display surface 11 after passing through the panel. The μ-prisms 54 are capable of accurately controlling an angle with respect to the light-emitting surface of the detection light output portion 50 by a tilt angle of an optical-path change surface, and the like.

When light output from the display surface 11 is reflected by an external reflecting object (object to be detected), the light passes through the display surface 11 to return to the liquid crystal display apparatus 10. The object to be detected is, for example, an indication means such as a finger of a user and a stylus pen. The detection light (infrared light L (IR) in this example) that returns to the liquid crystal display apparatus 10 by being reflected by the object to be detected will hereinafter be referred to as reflected detection light or reflected infrared light Lr (IR).

For a reflected detection light distribution measurement, a plurality of light-receiving devices 36 are formed on the drive substrate 30 inside the display portion, for example.

The light-receiving devices 36 may be arranged at regular intervals, but are desirably arranged in pairs with respect to microlenses.

Figure 2:
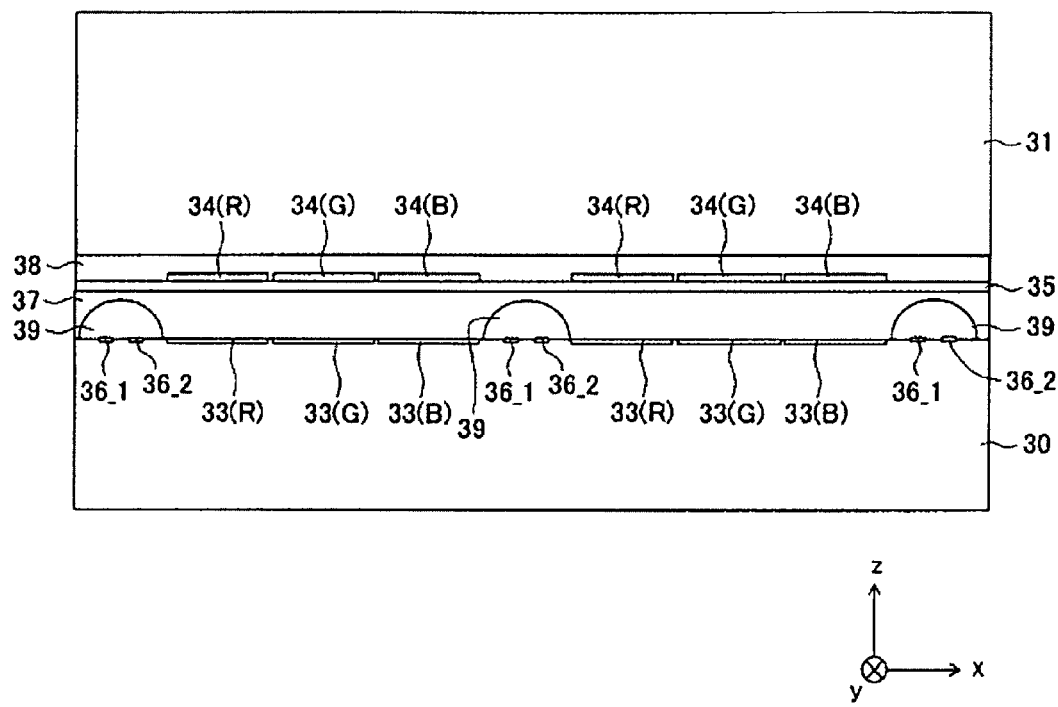
FIG. 2 is an enlarged cross-sectional diagram showing a state where light-receiving devices and microlenses are combined.

FIG. 2 is an enlarged cross-sectional diagram showing a combination of the light-receiving devices 36 and the microlens.

On one main surface of the drive substrate 30, a circuit-forming layer is provided for each color. A circuit-forming layer 33 (R), a circuit-forming layer 33 (G), and a circuit-forming layer 33 (B) each correspond to a sub-pixel forming an effective pixel in video display. Each circuit-forming area is an arrangement area for a TFT, a condenser electrode, wirings, and the like.

On the other hand, an interlayer film 38 is formed on the opposing substrate 31, and color filters including an R filter 34 (R), a G filter 34 (G), and a B filter 34 (B) are formed on the interlayer film 38 on the liquid crystal layer 35 side.

The three circuit-forming areas corresponding to R, G, and B or areas including the three filters will hereinafter be referred to as "sub-pixel trio". A part of the drive substrate 30 between one sub-pixel trio and another sub-pixel trio is a light-receiving device arrangement area. The light-receiving device arrangement area may be provided for each of the plurality of sub-pixel trios as long as the areas are provided regularly as a whole, for example.

Here, as a desirable arrangement, light-receiving devices 36_1 and 36_2 are arranged in a pair. Hereinafter, the light-receiving devices 36_1 and 36_2 will be simply referred to as light-receiving devices 36 unless there is a need to make a distinction between those two in particular.

The light-receiving devices 36 are each a photodiode constituted of a TFT layer as in the case of other transistors, for example. The TFT layer may either be amorphous silicon or polysilicon. When the light-receiving devices 36 are each a photodiode, either a PIN structure having an I (Intrinsic) area or a PDN structure having a D (Doped) area between two high-concentration impurity areas of an anode and a cathode may be used. The photodiode may include a control gate for controlling a depletion degree.

A microlens 39 is formed above the pair of light-receiving devices constituted of the light-receiving devices 36_1 and 36_2. Accordingly, the pair of light-receiving devices is arranged inside a light collection area of the microlens 39. The microlens 39 is arranged in an area between the sub-pixel trios and embedded in a planarization film 37 deposited on the circuit-forming surface of the drive substrate 30.

Although a pitch of the pair of light-receiving devices (36_1 and 36_2) in a lateral (x) direction in FIG. 2 is arbitrary, an example of the pitch is about 0.8 mm.

Figure 3A:
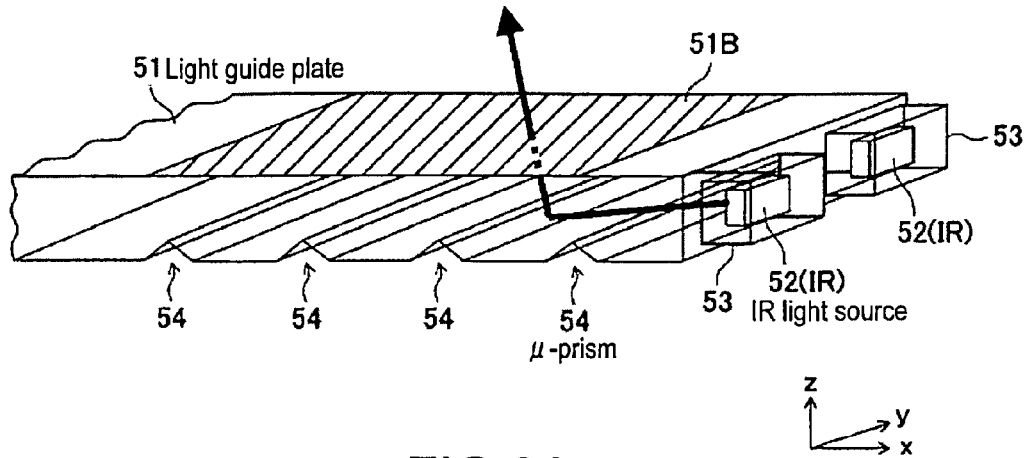
FIG. 3A is a perspective view showing a configuration example of a μ-prism.
Figure 3B:
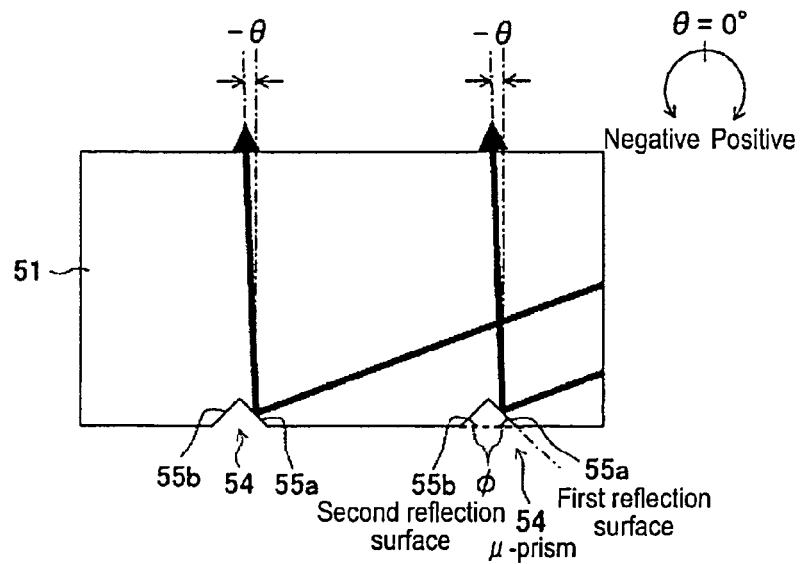
FIG. 3B is a schematic cross-sectional diagram of a light guide plate showing a state of an optical path change by the μ-prism.

FIG. 3A is a perspective view showing a configuration example of the μ-prisms 54. FIG. 3B is a schematic cross-sectional diagram of the light guide plate 51 showing a state of an optical path change by the μ-prisms 54.

The μ-prisms 54 of this embodiment shown in FIG. 3 are optical devices that have triangular cross sections and are formed integrally with the light guide plate 51. The μ-prisms 54 of this example can be realized by forming V-shaped grooves on a back surface of the light guide plate 51, for example. It should be noted that optical components having the same function as the μ-prisms 54 can be formed by a method of forming the μ-prisms 54 on a sheet or the like different from the light guide plate 51 and attaching the sheet to the light guide plate 51.

The μ-prisms 54 are arranged to form stripes elongated in a y direction parallel to the side surface of the light guide plate 51 on which the infrared LED 52 (IR) is provided. Moreover, the μ-prisms 54 are formed penetratingly between the two side surfaces of the light guide plate 51 in the y direction.

A width of the μ-prisms 54 (size in x direction) is, for example, about 10 μm, and the plurality of μ-prisms 54 are arranged in the x direction as parallel stripes elongated in the y direction at a predetermined pitch of about several-ten μm to several-hundred μm. Alternatively, for obtaining a sufficient optical intensity, it is possible to arrange several to several-ten μ-prisms 54 locally at a relatively-narrow pitch and arrange the bundles of μ-prisms 54 in the x direction at regular intervals at a relatively-large pitch.

As shown in FIG. 3B, each of the μ-prisms 54 includes, as slopes on a inner side of the light guide plate 51, a first reflection surface 55a closer to one of the two side surfaces of the light guide plate 51 in the y direction and a second reflection surface 55b closer to the other side surface. The first reflection surface 55a and the second reflection surface 55b each have a tilt angle $\phi$ with respect to a back surface of the light guide plate 51 (total-reflection surface on reflection sheet side; hereinafter, referred to as counter-output surface). The tilt angle is adjusted by the forming method of the μ-prisms 54. With the tilt angle $\phi$ of 45 degrees, light reflected on the reflection surface is output most efficiently from an output surface (upper surface) of the light guide plate 51 as detection light.

When the tilt angle is $\phi$ as shown in FIG. 3B, the detection light (infrared light L (IR)) is output as oblique light at a negative angle ($-\theta$) with respect to a vertical line with respect to the output surface.

The operation described above can also be obtained with light from the infrared LED 52 (IR) provided on the other side surface of the light guide plate 51 in the y direction (left-hand side surface not shown in FIG. 3). In this case, since the second reflection surface 55b shown in FIG. 3B is an actual reflection surface, the detection light is output as oblique light at a positive angle ($+\theta$).

The same holds true for all the μ-prisms 54. Thus, bidirectional parallel light beams are output as detection light from an area 51B of the output surface of the light guide plate 51. Moreover, since the adjustable angle ($+\theta$, $-\theta$) is practically maintained even when the detection light exits the display surface 11 shown in FIG. 1, this angle is called detection light emission angle.

The detection light having specialized bidirectional parallel light components (aggregated light flux directions) is externally emitted from the display surface 11 shown in FIG. 1 and diffused and reflected by an external object to be detected to thus return to the liquid crystal panel. The light that returns by the reflection is called "reflected detection light".

Here, in a case where a width of the detection light is somewhat small and a light irradiation surface of the object to be detected exposed to the light is thus small, the light can be estimated to be diffused and reflected at one point of the object to be detected. This is because the object to be detected such as a finger and a stylus pen tip is normally sufficiently larger than light having a width of several-ten to several-hundred μm.

Although details will be given later, when the reflected detection light proceeds inside the liquid crystal panel and obliquely enters the microlens 39 shown in FIG. 2, light from one side of the x direction is efficiently collected at one of the pair of light-receiving devices (36_1 and 36_2). Moreover, light from the other side of the x direction is efficiently collected at the other one of the pair of light-receiving devices (36_1 and 36_2).

Here, the detection light emission angle ($+\theta$, $-\theta$) takes a known value, and an incident angle of the reflected detection light with respect to the display surface 11, furthermore, an incident angle of the reflected detection light with respect to the microlens 39 are determined based on that value. A refractive index of the microlens 39, a curvature of a lens surface thereof, an arrangement of the pair of light-receiving devices (36_1 and 36_2), and the like are determined so as to enable light having the two incident angles as described above to be received efficiently. Therefore, a light-receiving angle of the light-receiving devices takes a known value determined based on the detection light emission angle ($+\theta$, $-\theta$), the position of the microlens 39, and which of the two sides of the pair of light-receiving devices the light-receiving device is on. Here, the selective light reception includes having a sensitivity distribution in which a light-receiving sensitivity of a predetermined incident angle is higher than that of other incident angles.

BL/Sensor Scan and Structure Therefor

In a triangulation method to be described later, specifying a correspondence between the light-emitting position and the light-receiving position is important.

Here, when the object to be detected is as small as about 1 mm, for example, the number of pairs of light-receiving devices (36_1 and 36_2) that receive the reflected detection light is also limited. Therefore, by performing a back calculation from the light-receiving position of the reflected detection light, the light-emitting position of the detection light can be specified. However, since the object to be detected does not always have a plate shape that is parallel to the display surface 11, at a time the object to be detected is relatively large and the shape thereof is, for example, a sphere, a reflected detection light distribution expands, and an outline of the light-receiving area becomes vague. Moreover, the detection light emission angle (+θ, −θ) at a time the detection light exits the display surface 11 and the incident angle at a time the reflected detection light enters the display surface 11 differ to thus cause errors in the triangulation method to be described later, which is unfavorable.

In this regard, in this embodiment, an area to emit the detection light (hereinafter, referred to as emission area) is limited to a stripe-shaped area (one or plural linear areas). As will be described later, for reducing an operational load of the triangulation, it is desirable to limit a range of the emission area so that the emission angle and the incident angle become equivalent to an extent that a difference between the emission angle and the incident angle with respect to the display surface 11 can be regarded as an allowable error in the triangulation method according to a resolution of the height detection. It should be noted that in a case where the emission angle and the incident angle cannot be regarded as equivalent, a height detection is possible although an operational load increases. The height detection method will be described later in detail.

Figure 5:
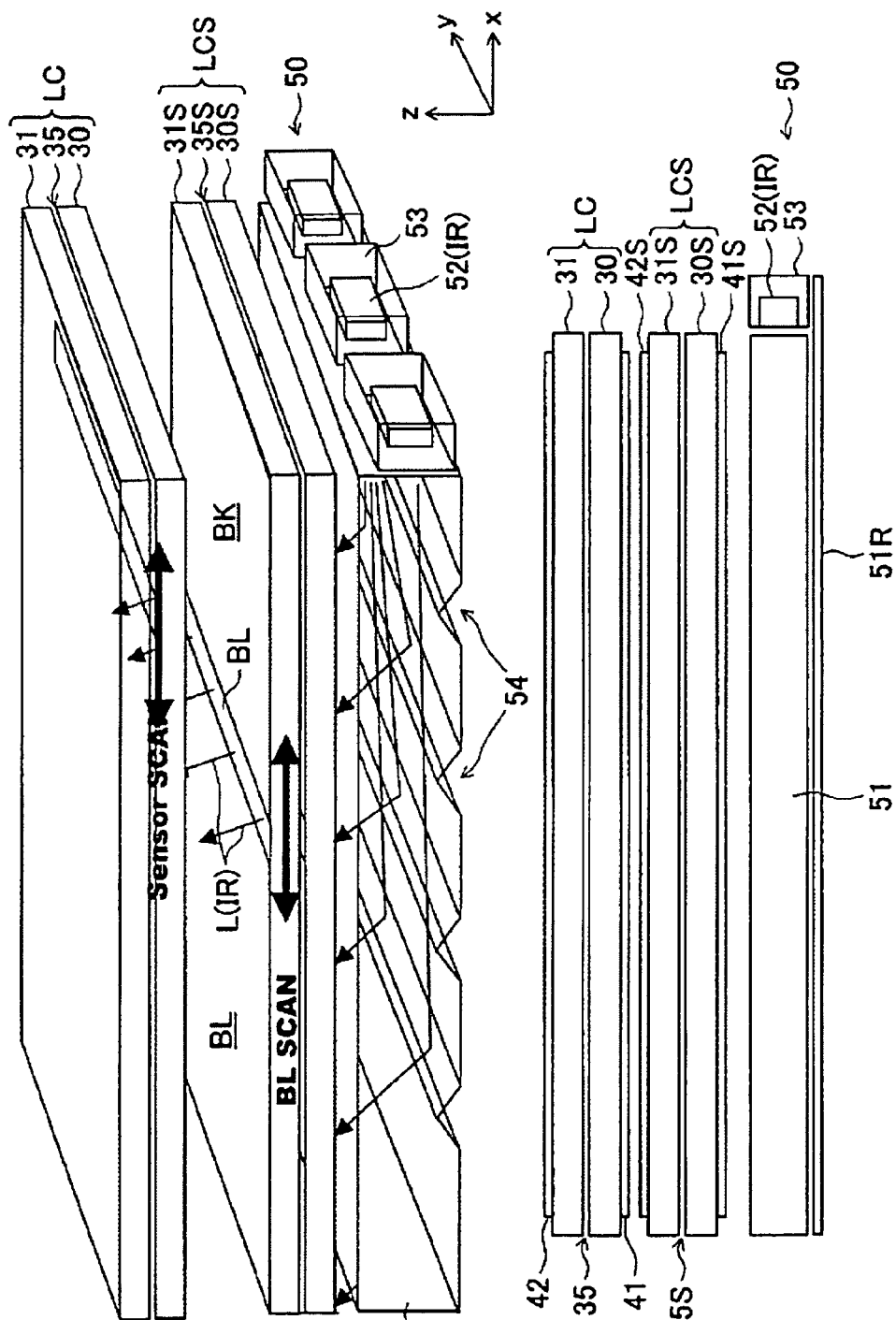
FIGS. 5A and 5B are a schematic perspective view and a schematic cross-sectional diagram showing a state where a liquid crystal layer for modulating infrared (IR) light is added.

Meanwhile, when the emission area is limited to the stripe-shaped area, there is a possibility that the detection light will not hit an object. Therefore, the stripe-shaped emission area of the detection light (hereinafter, referred to as bright line BL) is shifted a predetermined distance or by a pitch of the number of pixels, for example, in a stripe-width direction. At this time, the light-receiving position of the reflected detection light is also shifted. The bright line BL is shown in FIG. 5 to be described later.

For obtaining coordinates of the incident position of the reflected detection light, a scanning operation for externally outputting a light-receiving result of the light-receiving devices is executed for each position (shift) of the bright line BL. The scanning operation requires a sensor circuit including the light-receiving device and a select device. Scanning is effective means for extracting, when there are a large number of light-receiving devices, outputs from output lines that are limited in number due to restrictions on arrangements, in time series.

Figure 4:
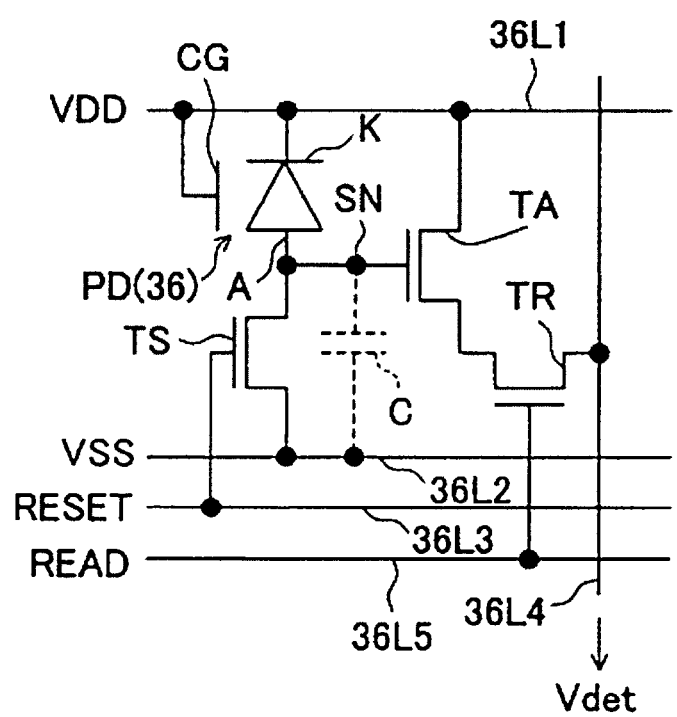
FIG. 4 is a light-receiving sensor circuit diagram.

FIG. 4 exemplifies a light-receiving sensor circuit including the light-receiving device 36 (photodiode PD).

A light-receiving sensor circuit 36C shown in FIG. 4 includes three transistors (N-channel TFTs in this case) and a photodiode PD (corresponding to light-receiving device 36).

The three transistors are a reset transistor TS, an amplifier transistor TA, and a read-out transistor TR.

The photodiode PD is an example of "a light-receiving device 36 having a sensitivity for invisible light (see FIGS. 1 and 2)". An anode of the photodiode PD is connected to a storage node SN, whereas a cathode thereof is connected to a supply line (hereinafter, referred to as VDD line) 36L1 of a power supply voltage VDD. The photodiode PD has a PIN structure or a PDN structure and includes a control gate CG that applies an electric field to an I area or a D area via an insulation film. The photodiode PD is inversely biased to be used and has a structure that is capable of optimizing (normally maximizing) a sensitivity by controlling a depletion degree by the control gate CG.

Regarding the reset transistor TS, a drain is connected to the storage node SN, a source is connected to a supply line (hereinafter, referred to as VSS line) 36L2 of a reference voltage VSS, and a gate is connected to a supply line (hereinafter, referred to as reset line) 36L3 of a reset signal (RESET). The reset transistor TS switches the storage node SN from a floating state to a VSS-line-36L2-connected state to discharge the storage node SN, and resets a stored charge amount.

Regarding the amplifier transistor TA, a drain is connected to the VDD line 36L1, a source is connected to an output line (hereinafter, referred to as detection line) 36L4 of a detection potential Vdet (or detection current Idet) via the read-out transistor TR, and a gate is connected to the storage node SN.

Regarding the read-out transistor TR, a drain is connected to a source of the amplifier transistor TA, a source is connected to the detection line 36L4, and a gate is connected to a supply line (hereinafter, referred to as read control line) 36L5 of a read control signal (READ).

The amplifier transistor TA operates to amplify, when positive charges generated by the photodiode PD are stored in the storage node SN switched to the floating state again after the reset, the stored charge amount (corresponding to light-receiving potential). The read-out transistor TR is a transistor for controlling a timing to discharge a light-receiving potential amplified by the amplifier transistor TA to the detection line 36L4. Since the read control signal (READ) is activated and the read-out transistor TR is turned on after an elapse of a certain storage time, a voltage is applied to the source and drain of the amplifier transistor TA so as to cause a current corresponding to a gate potential at that time to flow therethrough. Accordingly, a potential change of an increased amplitude appears in the detection line 36L4 in accordance with the light-receiving potential, and this potential change is output to an outside of the light-receiving sensor circuit 36C from the detection line 36L4 as the detection potential Vdet. Alternatively, the detection current Idet whose value changes based on the light-receiving potential is output to the outside of the light-receiving sensor circuit 36C from the detection line 36L4.

The scanning operation is executed by the control of the reset line 36L3 and the read control line 36L5. It is assumed that wirings thereof are provided in common among the plurality of light-receiving circuits 36C (light-receiving sensor row) arranged in the x direction in the coordinate system shown in FIGS. 1 to 3, for example.

In this case, a sensor read-out signal (light-receiving signal) is generated in the plurality of detection lines 36L4 elongated in the y direction every time reading of the light-receiving sensor row is carried out. The light-receiving signals are output from the plurality of detection lines 36L4 to the outside of the display panel in time series every time control of the reset line 36L3 and the read control line 36L5 is repeated while changing the reading row.

Next, means for limiting the detection light emission area to the stripe-shaped bright line BL will be described.

In the structure shown in FIG. 1, the liquid crystal layer 35 corresponds to an optical modulation layer for video display. The structure shown in FIG. 1 can also be adopted in the case of carrying out an object detection at a time a video is not displayed as long as the liquid crystal layer 35 is capable of controlling transmission and block of invisible light.

However, when the object detection is performed for inputting information such as a command during video display, the detection light needs to be invisible light such as IR light and an IR optical modulation means (e.g., liquid crystal layer) needs to be provided in addition to the liquid crystal layer 35.

FIG. 5 are structural diagrams showing a case where a liquid crystal layer 35S for modulating invisible light (IR light) is provided in addition to the liquid crystal layer 35 for modulating visible light. FIG. 5A is a schematic perspective view, and FIG. 5B is a schematic cross-sectional diagram.

FIG. 5 are schematic diagrams showing a structure from which the backlight 20, the white-color optical film 60, and the protective layer 43 are omitted although those are provided as in FIG. 1.

A liquid crystal display apparatus shown in FIG. 5 is different from the liquid crystal display apparatus 10 shown in FIG. 1 in that a BL scan liquid crystal portion LCS is added between the detection light output portion 50 and the drive substrate 30.

The same structures as FIG. 1, that is, the drive substrate 30, the opposing substrate 31, the liquid crystal layer 35, the first polarization plate 41, and the second polarization plate 42 will hereinafter be referred to as display liquid crystal portion LC.

It should be noted that in FIG. 5, a reflection member 51R of the light guide plate 51 is shown.

The BL scan liquid crystal portion LCS includes a BL drive substrate 30S and a BL opposing substrate 31S respectively corresponding to the drive substrate 30 and the opposing substrate 31 of the display liquid crystal portion LC, and a BL liquid crystal layer 35S interposed between those substrates. Moreover, the BL scan liquid crystal portion LCS includes a first polarization plate 41S and a second polarization plate 42S respectively corresponding to the first polarization plate 41 and the second polarization plate 42 of the display liquid crystal portion LC.

Although the display liquid crystal portion LC and the BL scan liquid crystal portion LCS have similar structures, the display liquid crystal portion LC modulates visible light whereas the BL scan liquid crystal portion LCS modulates invisible light (IR light). Therefore, the display liquid crystal portion LC and the BL scan liquid crystal portion LCS are structured such that materials of components and optical characteristics differ. In particular, the display liquid crystal portion LC constantly transmit IR light through an entire surface thereof, whereas the BL scan liquid crystal portion LCS constantly transmits visible light through an entire surface thereof.

Height Detection

Next, a height detection procedure will be described.

Figure 6:
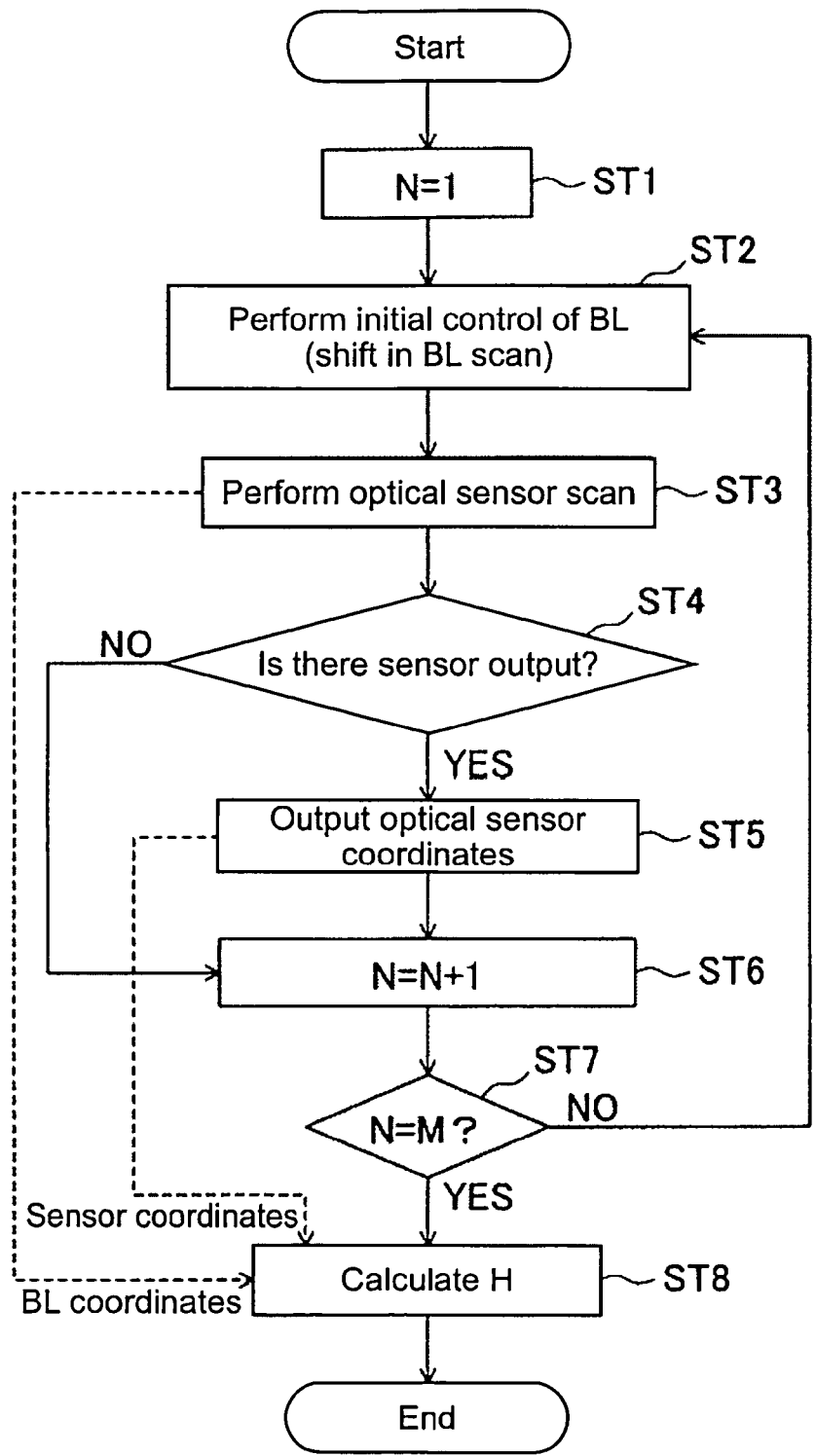
FIG. 6 is a flowchart of a height detection.

FIG. 6 is a flowchart showing the procedure. An algorithm of this flowchart is executed according to a program stored in a predetermined controller such as a CPU and a microcomputer of an electronic apparatus to be described later or a program input as appropriate.

Upon starting the height detection algorithm, a BL address N of 1 screen (1 frame period) is set to, for example, "1" in Step ST1.

In the next Step ST2, initial control of the bright line BL is performed. Specifically, a BL drive portion provided in the BL drive substrate 30S of the BL scan liquid crystal portion LCS or a BL drive portion whose partial function has been entrusted to a drive circuit outside the display panel is operated. Accordingly, a bright line BL in the case of N=1 is formed. Specifically, as shown in FIG. 5A, a bright line BL as a stripe-shaped IR light transmission area elongated in the y direction is formed on the BL liquid crystal layer 35S, and a range of the emission area of the infrared light L (IR) is thus narrowed down to a linear range. Hereinafter, the emission area of the infrared light L (IR) on the display surface 11 shown in FIG. 1 will be referred to as "BL area".

FIG. 7 are schematic cross-sectional diagrams of the apparatus showing a BL drive and an optical path change of the infrared light L (IR) from the BL area.

Figure 7A:
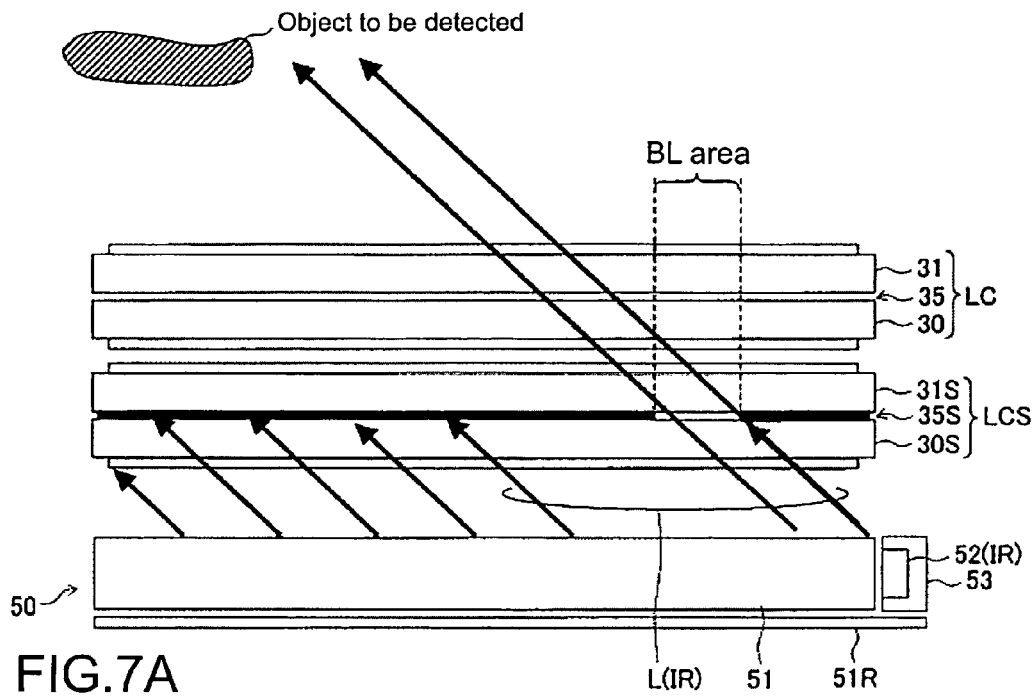
FIGS. 7A and 7B are schematic cross-sectional diagrams showing a BL drive and an IR optical path from a BL area, FIG. 7A showing a case of no IR hit, FIG. 7B showing a state where there is an IR hit.

As shown in FIG. 7A, when the infrared light L (IR) is not irradiated onto an object to be detected, reflected infrared light Lr (IR) as the "reflected detection light" is not caused.

Figure 7B:
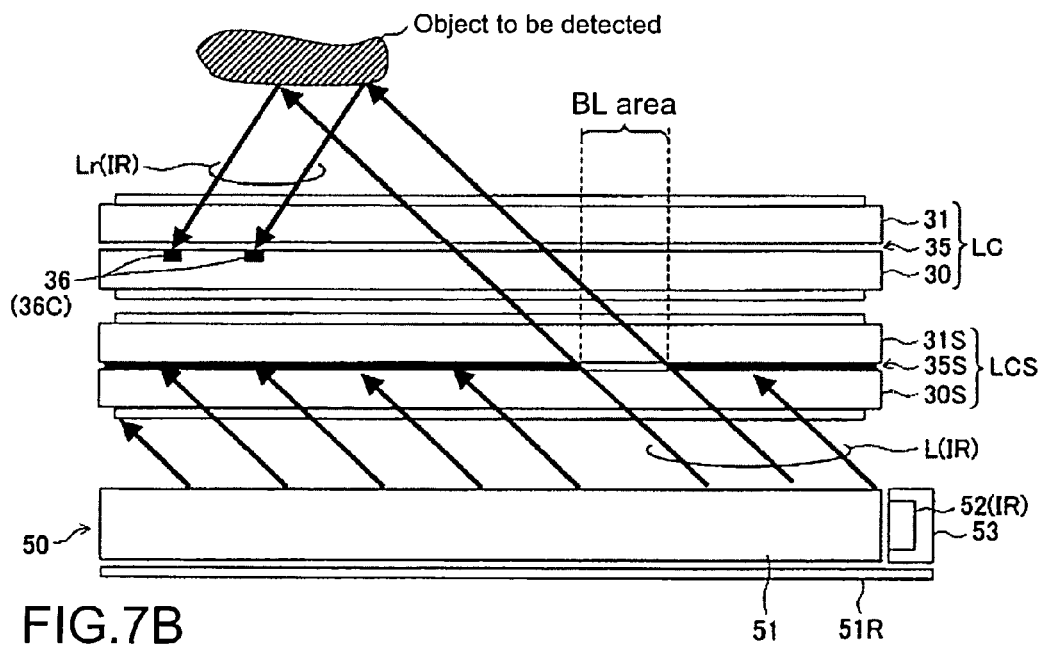

As shown in FIG. 7B, when the infrared light L (IR) is irradiated onto the object to be detected, the reflected infrared light Lr (IR) is caused, and the reflected infrared light Lr (IR) returns to the liquid crystal display apparatus. The reflected infrared light Lr (IR) passes through the opposing substrate 31 and the liquid crystal layer 35 of the display liquid crystal portion LC almost with no loss and reaches the alignment of the light-receiving devices 36 (light-receiving sensor circuits 36C) provided on the drive substrate 30.

Referring back to FIG. 6, in the next Step ST3, a drive circuit (not shown) of the light-receiving devices 36 (light-receiving sensor circuits 36C) carries out a 1-screen scanning operation (optical sensor scan) on the alignment of the light-receiving devices 36. The drive circuit is normally formed inside the liquid crystal display apparatus 10 (drive substrate 30), but it may be partially formed outside the liquid crystal display apparatus 10.

In Step ST4, a judgment is made on whether there is a sensor output. This judgment may either be made inside or outside the liquid crystal display apparatus 10. Usually, a controller of the electronic apparatus into which the liquid crystal display apparatus 10 is incorporated carries out this judgment.

More specifically, a 1-screen distribution of light-receiving signals obtained by the optical sensor scan of Step ST3 is used for judging whether there is an effective sensor output. Whether the sensor output is effective or not is judged based on whether a light-receiving signal level is a certain threshold value or more, for example. Further, for distinguishing from noises, whether there is a sensor output may be judged based on whether the number of sensor outputs having a light-receiving signal level of a certain threshold value or more is a certain ratio or more or whether the sensor outputs exist within a limited range.

If it is judged as "no sensor output (NO)", the processing flow skips Step ST5, and when judged as "sensor output present (YES)", coordinates of the optical sensor (hereinafter, referred to as sensor coordinates) judged as "sensor output present" are output in Step ST5. The sensor coordinates are output to, for example, a processing IC of an external controller to be used for a height (H) calculation.

In Step ST6, the BL address N is incremented (N=N+1), and whether the BL address N has reached a BL division number M is judged in Step ST7.

When judged NO in the judgment of Step ST7, the processing flow returns to Step ST2 to repeat Steps ST2 to ST7.

When judged YES in the judgment of Step ST7, height (H) calculation processing is executed by the external processing IC or the like in Step ST8.

Figure 8A:
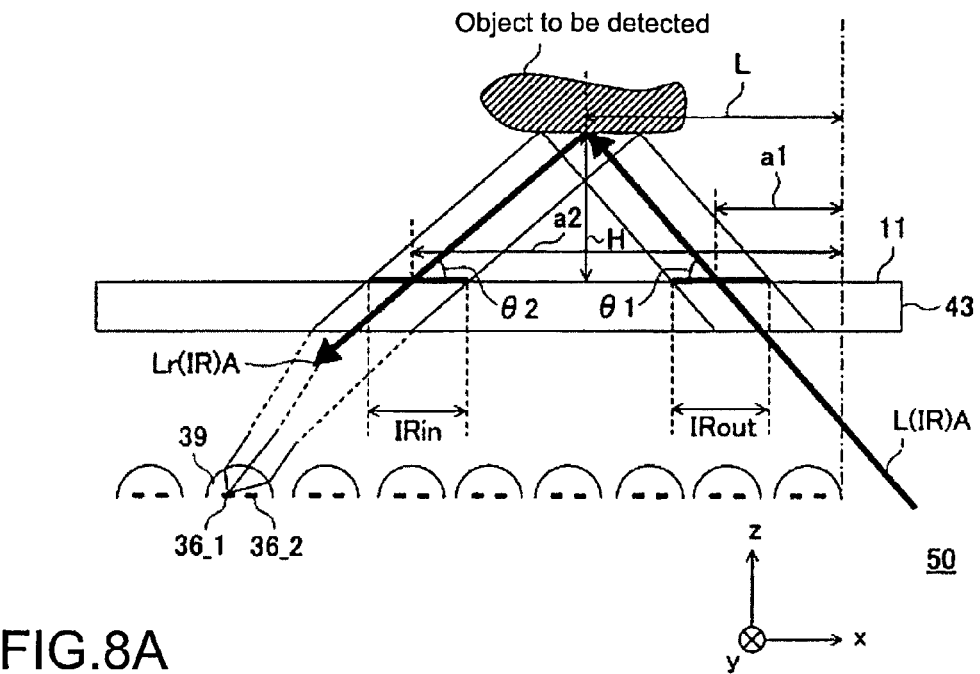
FIG. 8 are diagrams schematically showing an H calculation method, FIG. 8A showing an irradiation from a positive side of an x direction, FIG. 8B showing an irradiation from a negative side of the x direction.
Figure 8B:
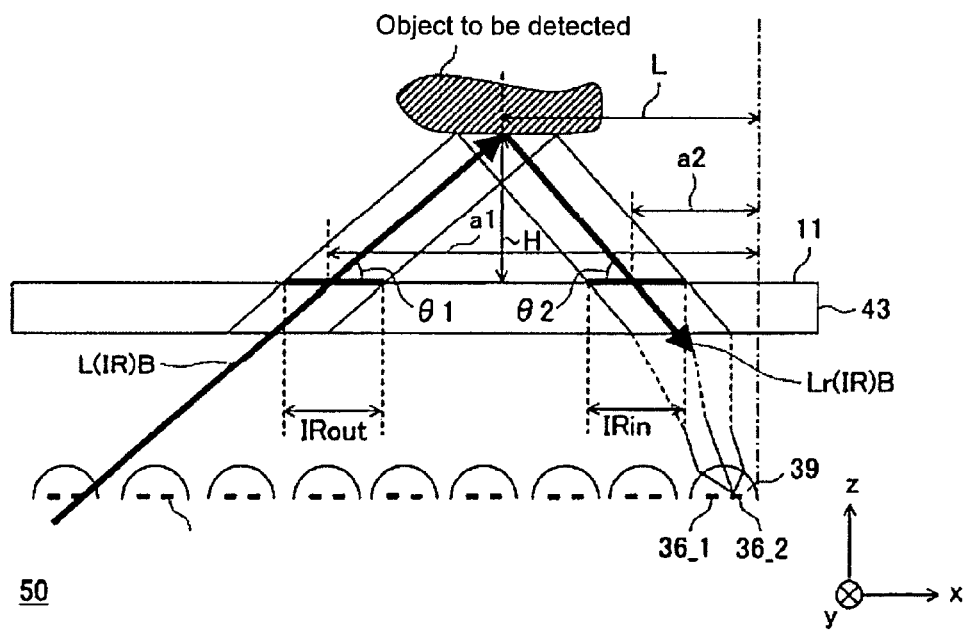

FIG. 8A is an explanatory diagram schematically showing an H calculation method (triangulation method). FIG. 8A shows light reception of IR light from the light source on a positive side of the x direction (hereinafter, referred to as infrared light L (IR) A), and FIG. 8B shows light reception of IR light from the light source on a negative side of the x direction (hereinafter, referred to as infrared light L (IR) B).

In FIG. 8, in association with the bright line BL (see FIG. 5), a stripe-shaped area on the display surface 11 elongated in the y direction is defined as "emission area IRout" of the infrared light L (IR). Moreover, an area of the display surface 11 that the reflected infrared light Lr (IR) from the object to be detected enters is defined as "incident area IRin". Furthermore, an emission angle at which the infrared light L (IR) intersects with the display surface 11 is defined as "θ1", and an incident angle at which the reflected infrared light Lr (IR) intersects with the display surface 11 is defined as "θ2".

FIG. 8 show ranges of the infrared light L (IR) and the reflected infrared light Lr (IR) and representative lines (e.g., center lines) (thick lines) thereof. Points at which the representative lines (thick lines) of the IR light intersect with the display surface 11 are respectively defined as IR-light emission position and IR-light incident position.

The x coordinate (a1) of the emission position is determined uniquely in advance based on the x coordinate of the bright line BL at that time, a known emission angle (+θ or −θ), and a distance between the bright line BL and the display surface 11.

On the other hand, the x coordinate (a2) of the incident position largely differs depending on a distance between the display surface 11 and the object to be detected (height H).

The x coordinate (a2) of the incident position is obtained by converting an x coordinate at a center of the light-receiving position judged based on the distribution obtained by the 1-screen scan of the plurality of light-receiving devices 36 into an x coordinate of the incident position on the display surface 11.

Means for executing the H calculation (height detection portion; e.g., processing IC and controller) in Step ST8 shown in FIG. 6 first converts the sensor coordinate (x coordinate at center of light-receiving position) obtained in Step ST5 into an x coordinate (a2) of the incident position on the display surface 11, and obtains an actual measurement value thereof. The height detection portion inputs in advance the x coordinate of the bright line BL (x coordinate at center of width) output by the process of Step ST3 and also calculates and stores in advance the x coordinate (a1) of the emission position.

In this embodiment, either a first calculation method in which the height H is calculated based on information obtained from FIG. 8A or 8B or a second calculation method in which the height H is calculated based on information obtained by the scan in different directions as in FIGS. 8A and 8B can be adopted.

First Calculation Method

As a presupposition of the first calculation method, it is necessary to limit a range of the emission area IRout so that each of the emission angle θ1 and the incident angle θ2 becomes equivalent (is regarded as a single value) to an extent that a difference (variation) of the emission angle and a difference (variation) of the incident angle with respect to the display surface 11 can be regarded as an allowable error in the triangulation method with respect to a resolution of the height detection. In other words, a case where a width of the emission area IRout shown in FIG. 8A or 8B is sufficiently small (size of object to be detected is sufficiently large with respect to width) and emission light is diffused and reflected by the surface of the object to be detected corresponds to this case. Even when the object to be detected is parallel to the display surface 11 or even when the object to be detected is tilted from the parallel state, the emission angle θ1 and the incident angle θ2 do not change. Therefore, each of the emission angle θ1 and the incident angle θ2 is made equivalent to the extent that a difference therebetween can be regarded as an allowable error in the triangulation method according to the resolution of the height detection.

The following Equation (1) on the height H is established for one of the parallel light beams shown in FIG. 8A or 8B.

[Equation 1]

$$H=|a1-a2|*\tan θ1*\tan θ2/(\tan θ1+\tan θ2) \qquad (1)$$

In this case, the x coordinate (a1) of the emission position, the x coordinate (a2) of the incident position, the emission angle θ1, and the incident angle θ2 are all known values. Thus, the height H can be obtained by simply solving Equation (1) above once. In this case, although measurement accuracy is slightly lowered, the height H can be obtained even with the incident angle θ2 of 90 degrees.

Second Calculation Method

In a case where the emission angle θ1 or the incident angle θ2 cannot be regarded as equivalent, the x coordinate (a1) of the emission position and the x coordinate (a2) of the incident position obtained by the scan in the direction shown in FIG. 8A, for example, and the emission angle θ1 (known value) are substituted into Equation (1) above with the incident angle θ2 and the height H as unknown parameters.

Next, the x coordinate (a1) of the emission position and the x coordinate (a2) of the incident position obtained by the scan in the direction shown in FIG. 8B and the emission angle θ1 (known value) are substituted into Equation (1) above with the incident angle θ2 and the height H as unknown parameters.

By solving the two simultaneous equations above and removing the incident angle θ2, the height H can be obtained.

Which of a signal obtained by the scan of FIG. 8A and a signal obtained by the scan of FIG. 8B the light-receiving signal output from the detection line 36L4 (FIG. 4) is can be judged based on which of the detection line corresponding to the light-receiving device 36_1 and the detection line corresponding to the light-receiving device 36_2 the detection line 36L4 is.

It should be noted that the width of the bright line BL in the x direction can be set arbitrarily as long as the light-receiving position in the case of FIG. 8A and the light-receiving position in the case of FIG. 8B do not overlap each other in any height measurement within a certain height range assumed (detectable range). In other words, if the width of the bright line BL in the x direction is too large, the two light-receiving positions overlap each other, and it thus becomes difficult to accurately judge the light-receiving position. However, even if the light-receiving positions overlap each other, the two light-receiving positions can still be estimated based on an overlapped area with a high light-receiving signal level and areas on both sides thereof with a low light-receiving signal level.

On the other hand, if the width of the bright line BL in the x direction is too small, it takes a long time to carry out the BL scan and the sensor scan for each BL step movement.

Therefore, an appropriate width of the bright line BL in the x direction is determined based on the two viewpoints.

It is only necessary to determine which of the first calculation method and the second calculation method is to be adopted in accordance with whether the emission angle θ1 and the incident angle θ2 can be regarded as equivalent from the determined width of the bright line BL in the x direction.

Moreover, when the microlenses 39 shown in FIG. 2 are provided, even when the light beams overlap, which of the light-receiving devices 36_1 and 36_2 is imparted a sensitivity differs depending on the incident direction, so the light-receiving position can be judged more accurately. Further, a detection sensitivity is improved by light collection performance of the lenses, with the result that a narrow bright line BL can be obtained without increasing the output of the light source. In other words, the provision of the microlens 39 and the pair of light-receiving devices is desirable not only in the case of executing the second calculation method, but also in the case of executing the first calculation method since it is also effective in a case where the light beams overlap.

Further, by using Equation (2-1) below in the case of FIG. 8A and Equation (2-2) below in the case of FIG. 8B, a distance L from an origin to the object to be detected in the x direction can be calculated.

[Equations 2]

$$L = H/\tan\theta_1 + a_1 \quad (2\text{-}1)$$

$$L = H/\tan\theta_2 + a_2 \quad (2\text{-}2)$$

2. Modified Example 1

Figure 9:
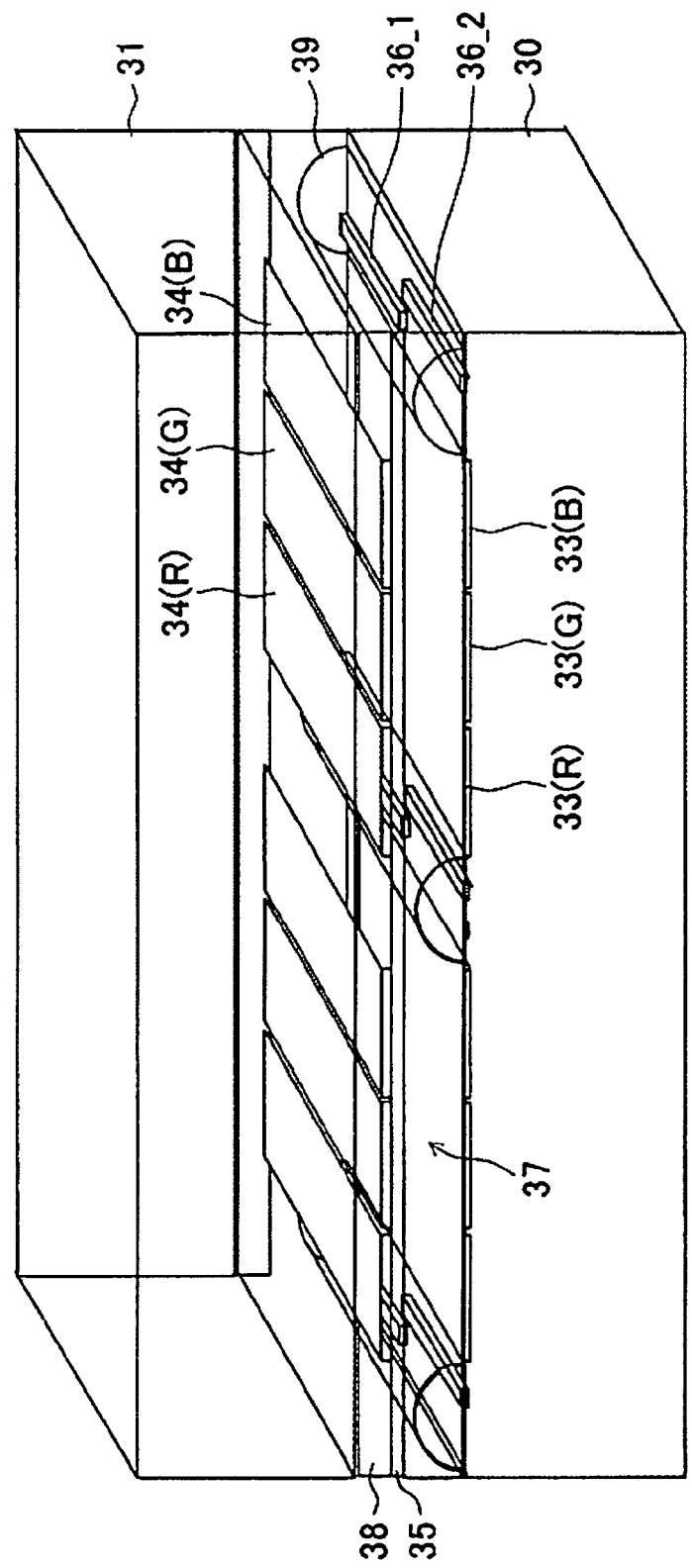
FIG. 9 is a perspective view regarding an arrangement of light-receiving devices of Modified Example 1.

FIG. 9 shows a modified example of the microlenses and the light-receiving devices.

As shown in FIG. 9, the microlens 39 may be constituted of a cylindrical lens having a y axis as a longitudinal axis. In this case, the light-receiving devices 36_1 and 36_2 are arranged alternately on both sides of a center axis (longitudinal axis) of a bottom surface of the cylindrical lens. A light-receiving surface of each of the light-receiving devices is formed to have a stripe shape along the longitudinal axis.

With such a structure, the sensor arrangement area having the same size as the pixel in the y direction can be used effectively to enhance sensitivity.

Figure 10:
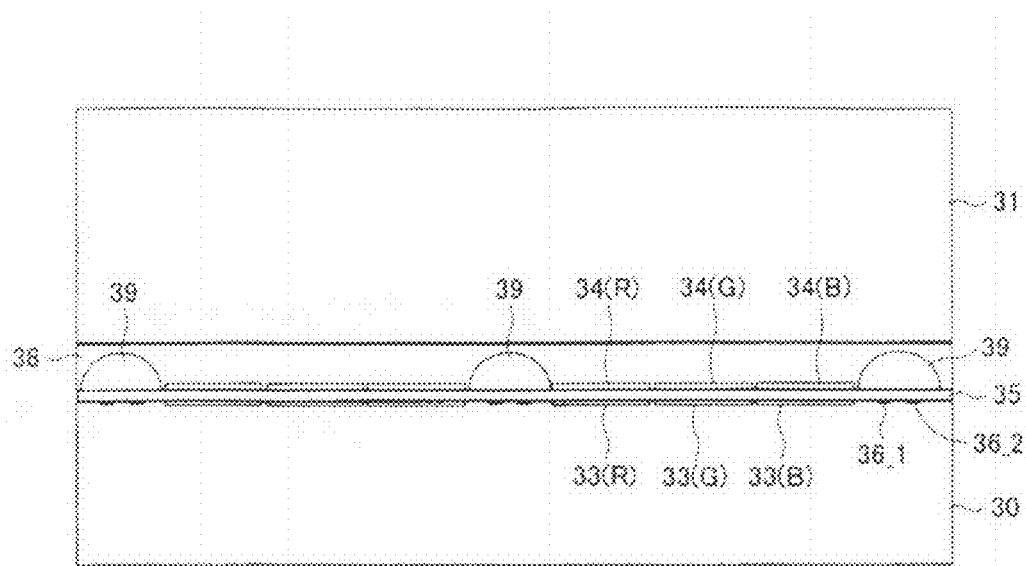
FIG. 10 is a schematic cross-sectional diagram regarding a lens arrangement of Modified Example 1.

FIG. 10 shows a modified example of the microlens arrangement.

As shown in FIG. 10, the microlens 39 may be formed on the same surface as the color filter layer 34 and embedded in the interlayer film 38.

Figure 11:
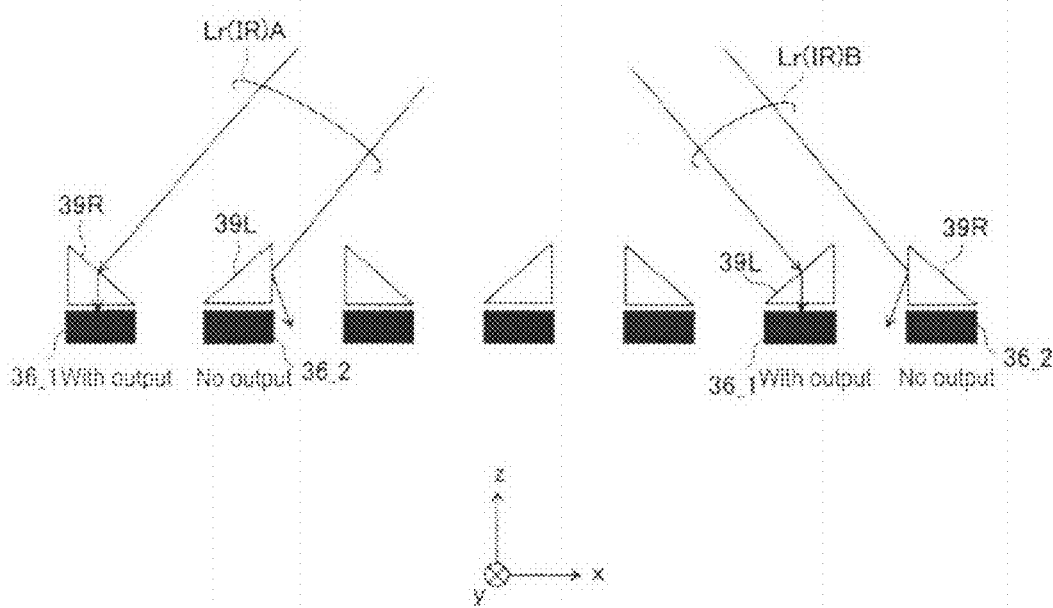
FIG. 11 is an explanatory diagram regarding an asymmetry lens of Modified Example 1.

Instead of the microlenses 39 shown in FIG. 8, a pair of asymmetry lenses (39R, 39L) may be provided in a sheet-like manner as shown FIG. 11, for example.

The triangular lens 39R having an incident surface on the positive side of the x direction effectively guides the reflected infrared light Lr (IR) A to the light-receiving device 36_1, but does not guide the reflected infrared light Lr (IR) B to the light-receiving device. On the contrary, the triangular lens 39L having an incident surface on the negative side of the x direction effectively guides the reflected infrared light Lr (IR) B to the light-receiving device 36_2, but does not guide the reflected infrared light Lr (IR) A to the light-receiving device.

The same functions as the microlenses 39 can be realized by the optical devices as described above.

3. Modified Example 2

Figure 12:
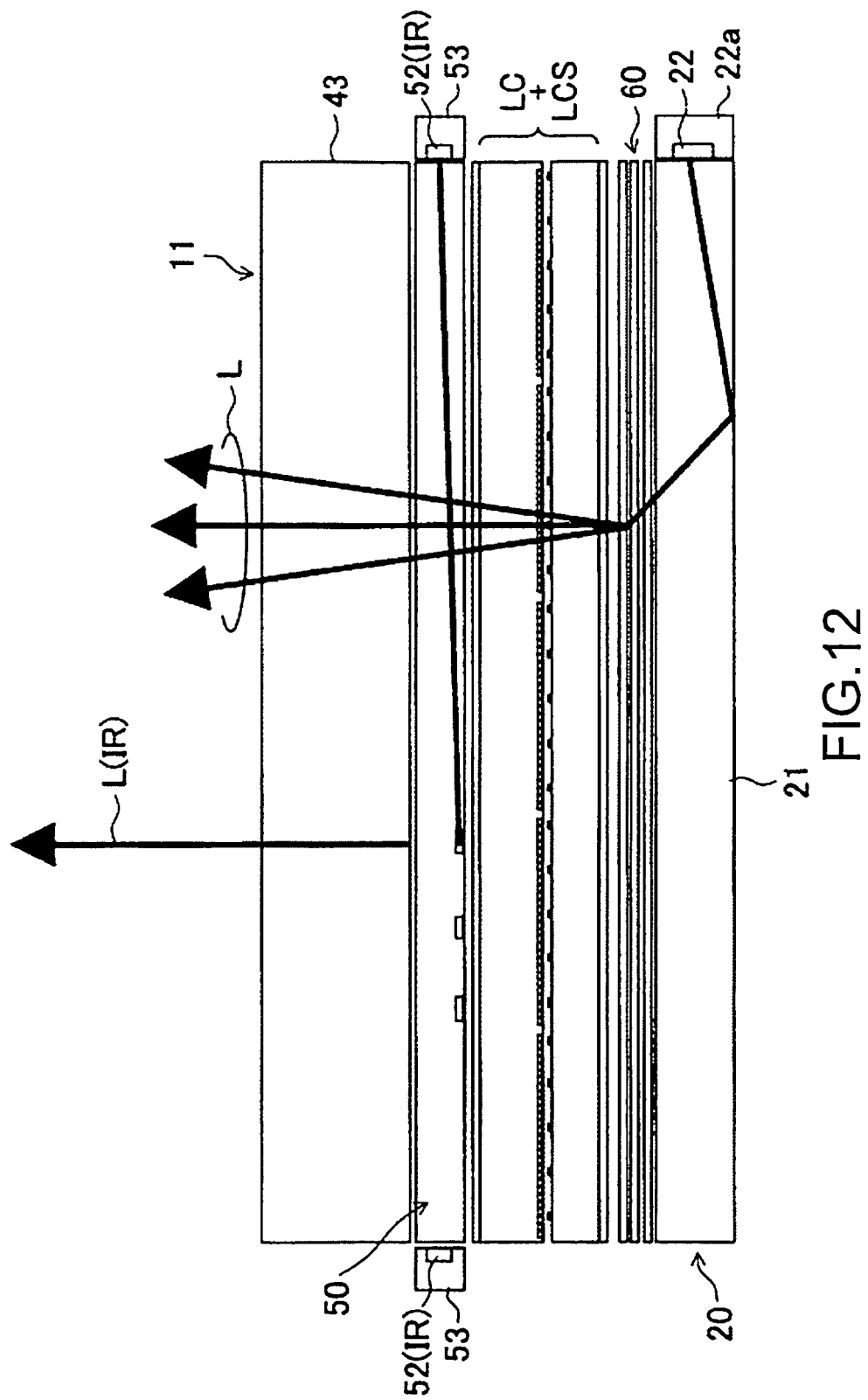
FIG. 12 is a schematic cross-sectional diagram regarding a position of a detection light output portion of Modified Example 2.
Figure 13:
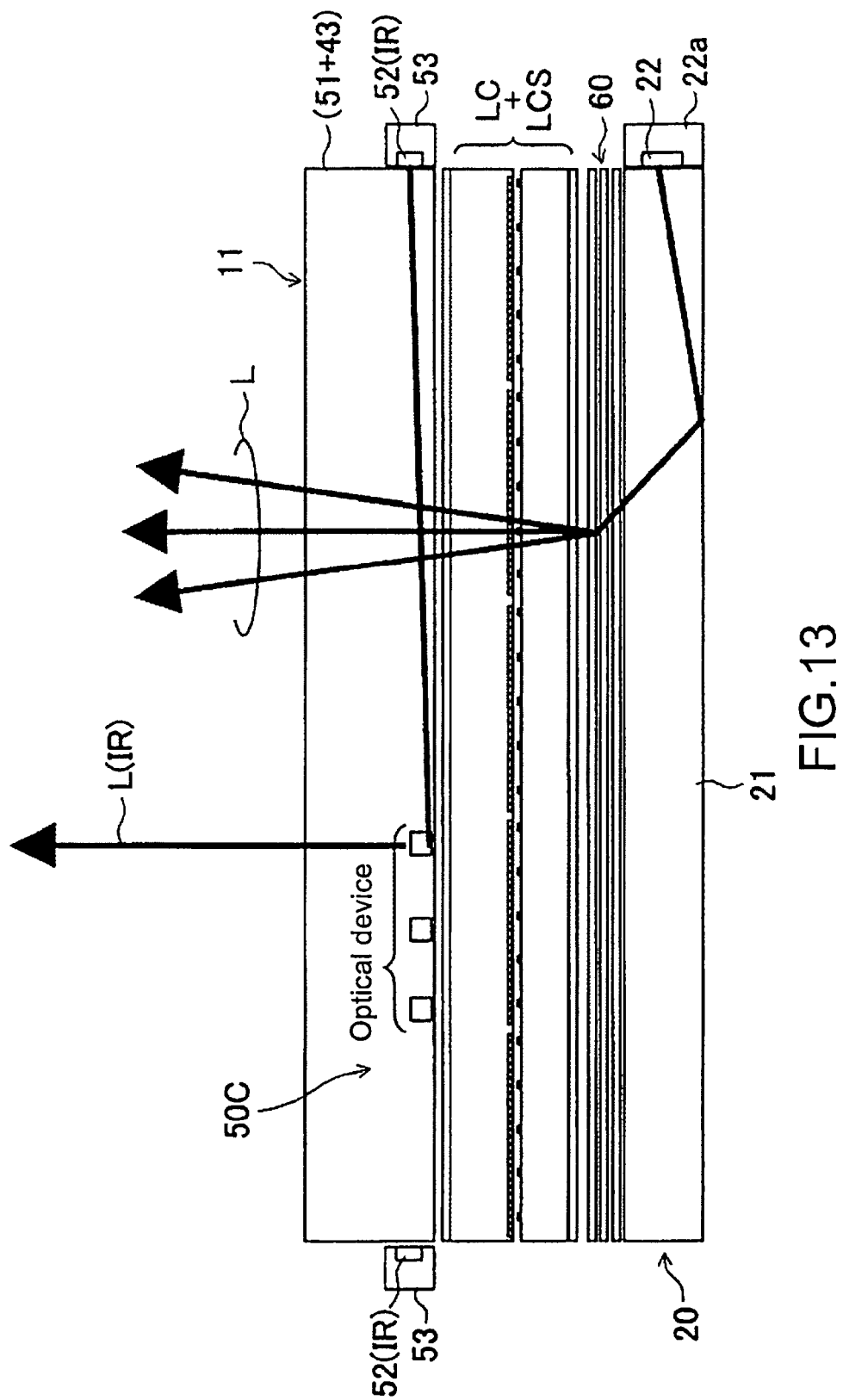
FIG. 13 is a schematic cross-sectional diagram regarding a structure of another detection light output portion of Modified Example 2.
Figure 14:
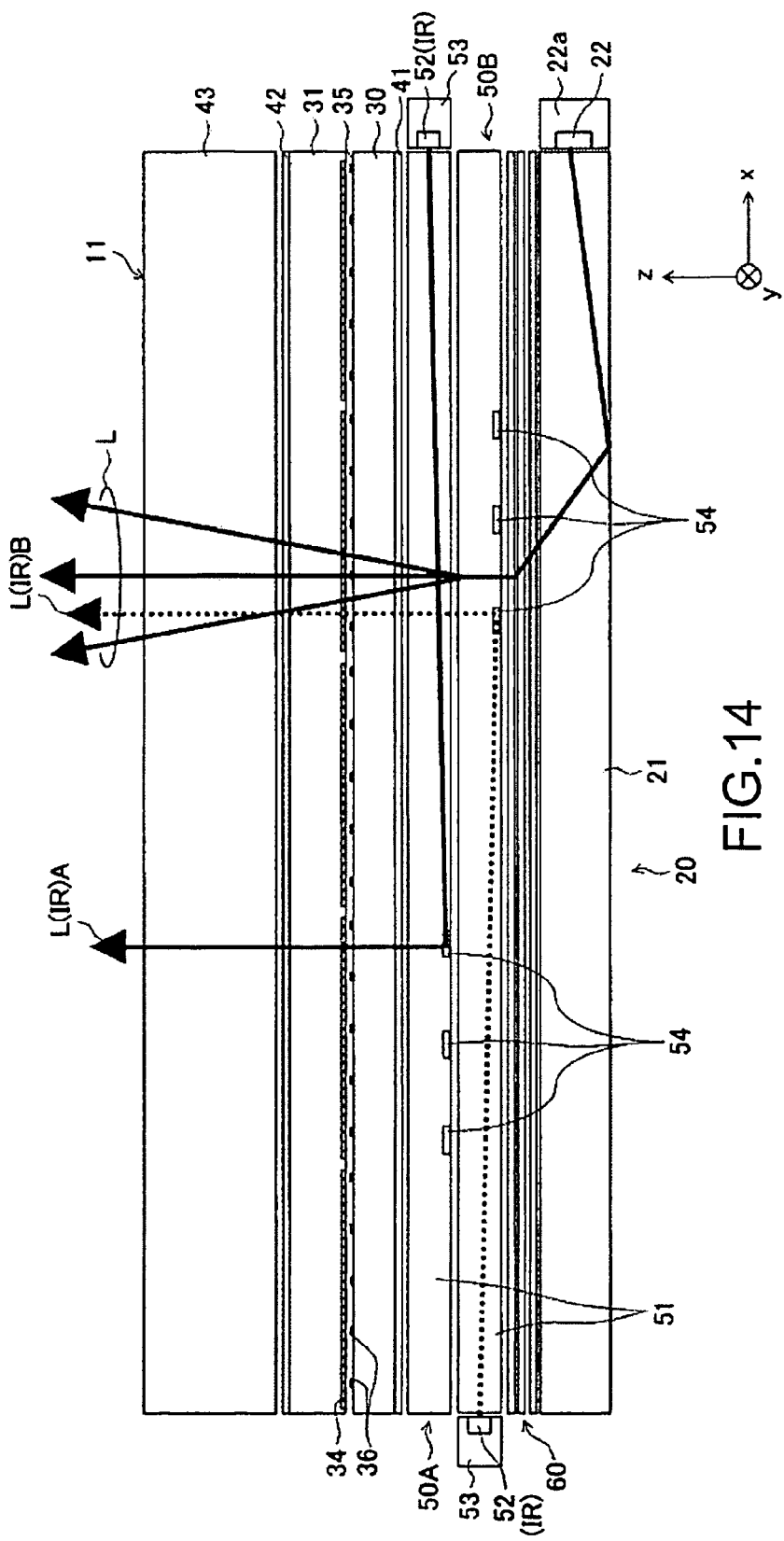
FIG. 14 is a schematic cross-sectional diagram regarding a structure of another detection light output portion of Modified Example 2.

FIGS. 12 to 14 show modifications on the detection light output portion.

An optical device that changes an optical path of the infrared light L (IR) to extend toward the display surface 11 is desirable in terms of ease in forming V-shaped grooves as in the above embodiment and high processing accuracy.

However, if special optical devices that do not become an obstacle of reflected detection light or that do not interfere with reflected detection light can be realized, the optical devices may be provided more on the display surface 11 side than a liquid crystal module (LC+LCS) as shown in FIGS. 12 and 13, for example. This structure has an advantage that since the light-receiving surface and the display surface 11 on which the triangulation method is carried out become closer, a distance conversion error becomes that much smaller.

Specifically, FIG. 12 shows a case where the detection light output portion 50 is provided between the liquid crystal module and the protective layer 43.

In FIG. 13, a detection light output portion 50C having both the function as the detection light output portion and the function as the protective layer 43 is provided. In this case, a surface of the detection light output portion 50C becomes the display surface 11.

It should be noted that as shown in FIG. 14, a detection light output portion 50A having an IR light source on the positive side of the x direction and a detection light output portion 50B having an IR light source on the negative side of the x direction may be laminated. This modification can be applied together with the modification of FIG. 12.

Various other modifications are applicable in this embodiment.

The shape of the emission area (light transmission area of BL scan liquid crystal portion LCS) is not limited to the stripe and may be, for example, a "disconnection parallel stripe" or a "disconnection zigzag shape". In addition, any shape and arrangement may be used for the emission area as long they are of regular patterns.

The embodiment and modified examples above have been described while taking the case where the function of the reflection detection apparatus according to the present invention is provided to the liquid crystal display apparatus as an example. However, other display apparatuses such as an organic EL display apparatus may be used for the display apparatus.

Moreover, as the electronic apparatus into which the display apparatus to which the present invention is applied is incorporated, any electronic apparatus such as a PC, a television apparatus, portable equipment including a cellular phone and a PDA, a camera apparatus for taking a moving image or a still image, and in-vehicle equipment including a car navigation system may be used.

With the structures described above, a reflection detection apparatus and a display apparatus capable of easily and accurately measuring a distance between an object to be detected and a light-emitting surface (display surface) can be realized.

Furthermore, in an electronic apparatus equipped with the reflection detection apparatus or the display apparatus, the height detection can be easily applied to various applications. Therefore, a totally-new application is expected to be created in a PC, a cellular phone, a game, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A reflection detection apparatus, comprising:
a light-emitting surface;
a detection light output portion operable to obliquely emit a detection light towards an external object from an emission area, wherein the emission area is a part of the light-emitting surface;
a plurality of light-receiving devices operable to selectively receive a reflected detection light, wherein the reflected detection light enters the light-emitting surface with a predetermined angle after being reflected by the external object; and
a height detection portion operable to obtain a height of a portion on the external object, at which the detection light is reflected, using positional information of a light-receiving device from the plurality of light-receiving devices which has received the reflected detection light and positional information of the emission area, wherein the height is a distance to the portion from the light-emitting surface.

2. The reflection detection apparatus according to claim 1, wherein the detection light output portion is operable to shift the emission area in one direction within the light-emitting surface and wherein the emission area obliquely emits the detection light.

3. The reflection detection apparatus according to claim 2, wherein the height detection portion is operable to obtain a coordinate a2 of an incident position of the reflected detection light in the shift direction and a coordinate a1 of a position of the emission area at a time the coordinate a2 is obtained, and
wherein the height detection portion is operable to obtain, using the obtained two coordinates a1 and a2, an emission angle θ1 of the detection light with respect to the light-emitting surface, an incident angle θ2 of the reflected detection light with respect to the light-emitting surface, and a value H corresponding to the height by solving Equation (1) below $$H=|a1-a2|*\tan\theta1*\tan\theta2/(\tan\theta1+\tan\theta2) \quad (1).$$

4. The reflection detection apparatus according to claim 1, wherein the detection light output portion is operable to output as the detection light, two parallel light beams that have tilt angle components in two opposite directions within the light-emitting surface, and shift the emission area in a direction parallel to the two opposite directions.

5. The reflection detection apparatus according to claim 4, wherein the height detection portion is operable to obtain, for each of the two parallel light beams, a coordinate a2 of an incident position of the reflected detection light in the shift direction and a coordinate a1 of a position of the emission area at a time the coordinate a2 is obtained, and
wherein the height detection portion is operable to obtain, using the obtained two coordinates a1 and a2, an emission angle θ1 of the detection light with respect to the light-emitting surface and a value H corresponding to the height by solving Equation (1) below established for each of the two parallel light beams, that is, $$H=|a1-a2|*\tan\theta1*\tan\theta2/(\tan\theta1+\tan\theta2) \quad (1),$$

wherein an incident angle θ2 of the reflected detection light with respect to the light-emitting surface and the value H corresponding to the height are unknown.

6. The reflection detection apparatus according to claim 1, further comprising a plurality of light-receiving lenses,
wherein the plurality of light-receiving devices are provided in a pair with each of the plurality of light-receiving lenses, and
wherein the two light-receiving devices in a pair are set apart from each other in the shift direction within a light collection range of the corresponding one of the plurality of light-receiving lenses.

7. A display apparatus, comprising:
a display surface;
a display portion having an image display function operable to output a display light modulated in accordance with an input video signal to an external object from the display surface and a function operable to obliquely emit a detection light towards an external object from an emission area, wherein the emission area is a part of the display surface;
a plurality of light-receiving devices operable to selectively receive a reflected detection light, wherein the reflected detection light enters the display surface with a predetermined angle after being reflected by the external object; and
a height detection portion operable to obtain a height of a portion on the external object, at which the detection light is reflected, using positional information of a light-receiving device from the plurality of light-receiving devices which has received the reflected detection light and positional information of the emission area, wherein the height is a distance to the portion from the display surface.

8. The display apparatus according to claim 7,
wherein the display portion is operable to shift the emission area in one direction within the display surface and wherein the emission area obliquely emits the detection light,
wherein the height detection portion is operable to obtain a coordinate a2 of an incident position of the reflected detection light in the shift direction and a coordinate a1 of a position of the emission area at a time the coordinate a2 is obtained, and
wherein the height detection portion is operable to obtain, using the obtained two coordinates a1 and a2, an emission angle θ1 of the detection light with respect to the display surface, an incident angle θ2 of the reflected detection light with respect to the display surface, and a value H corresponding to the height by solving Equation (1) below $$H=|a1-a2|*\tan\theta1*\tan\theta2/(\tan\theta1+\tan\theta2) \quad (1).$$

9. The display apparatus according to claim 7,
wherein the display portion is operable to output as the detection light, two parallel light beams that have tilt angle components in two opposite directions within the display surface, and shift the emission area in a direction parallel to the two opposite directions,
wherein the height detection portion is operable to obtain, for each of the two parallel light beams, a coordinate a2 of an incident position of the reflected detection light in the shift direction and a coordinate a1 of a position of the emission area at a time the coordinate a2 is obtained, and
wherein the height detection portion is operable to obtain, using the obtained two coordinates a1 and a2, an emission angle θ1 of the detection light with respect to the display surface and a value H corresponding to the height by solving Equation (1) below established for each of the two parallel light beams, that is, $$H=|a1-a2|*\tan\theta1*\tan\theta2/(\tan\theta1+\tan\theta2) \quad (1),$$

wherein an incident angle θ2 of the reflected detection light with respect to the display surface and the value H corresponding to the height are unknown.

10. The display apparatus according to claim 7, wherein the display portion comprises:
 a first surface-emitting portion operable to emit the display light,
 a second surface-emitting portion operable to emit the detection light having a planar shape at a predetermined angle with respect to the display surface, and
 an optical modulation panel portion that is provided between the first, second surface-emitting portions and the display surface, wherein the optical modulation panel portion is operable to optically modulate the display light from the first surface-emitting portion into a display image light based on the input video signal, causes the detection light to output from the second surface-emitting portion to pass through an area corresponding to the emission area of the display surface, blocks the detection light at other areas, and shifts the emission area in one direction.

11. The display apparatus according to claim 10, wherein the second surface-emitting portion comprises
 a light source operable to emit the detection light,
 a light guide plate operable to internally reflects the detection light from the light source and diffuses the detection light in a planar shape, and
 an optical device operable to locally changes a direction of the detection light that passes through the light guide plate, and operable to obliquely outputs the detection light from an output surface of the light guide plate on the display portion side.

12. The display apparatus according to claim 11,
 wherein the light source is provided on two side surfaces of the light guide plate opposed to each other, and
 wherein the optical device comprises a first optical-path change surface operable to reflect or refract the detection light from a first light source disposed on one of the side surfaces of the light guide plate and a second optical-path change surface operable to reflect or refract light from a second light source disposed on the other one of the side surfaces of the light guide plate.

13. The display apparatus according to claim 7, further comprising a plurality of light-receiving lenses,
 wherein the plurality of light-receiving devices are provided in a pair with each of the plurality of light-receiving lenses, and
 wherein the two light-receiving devices in a pair are set apart from each other in one direction within a light collection range of the corresponding one of the plurality of light-receiving lenses.

14. An electronic apparatus, comprising:
 a display panel; and
 a circuit portion operable to a video to be displayed on the display panel; wherein
 the display panel comprises:
  a display surface operable to displays the video,
  a display portion having an image display function operable to output a display light modulated in accordance with an input video signal to an external object from the display surface and a function operable to obliquely emit a detection light towards an external object from an emission area, wherein the emission area is a part of the display surface,
  a plurality of light-receiving devices operable to selectively receive a reflected detection light, wherein the reflected detection light enters the display surface with a predetermined angle after being reflected by the external object, and
  a height detection portion operable to obtain a height of a portion on the external object, at which the detection light is reflected, using positional information of a light-receiving device from the plurality of light-receiving devices which has received the reflected detection light and positional information of the emission area, wherein the height is a distance to the portion from the display surface.

15. The electronic apparatus according to claim 14,
 wherein the display portion is operable to shift the emission area in one direction within the display surface and wherein the emission area obliquely emits the detection light,
 wherein the height detection portion operable to obtains a coordinate a2 of an incident position of the reflected detection light in the shift direction and a coordinate a1 of a position of the emission area at a time the coordinate a2 is obtained, and
 wherein the height detection portion operable to obtains, using the obtained two coordinates a1 and a2, an emission angle θ1 of the detection light with respect to the display surface, an incident angle θ2 of the reflected detection light with respect to the display surface, and a value H corresponding to the height by solving Equation (1) below $$H=|a1-a2|*\tan θ1*\tan θ2/(\tan θ1+\tan θ2) \quad (1).$$

16. The electronic apparatus according to claim 14,
 wherein the display portion is operable to output as the detection light from the emission area, two parallel light beams that have tilt angle components in two opposite directions within the display surface, and shift the emission area in a direction parallel to the two opposite directions,
 wherein the height detection portion is operable to obtain, for each of the two parallel light beams, a coordinate a2 of an incident position of the reflected detection light in the shift direction and a coordinate a1 of a position of the emission area at a time the coordinate a2 is obtained, and
 wherein the height detection portion is operable to obtain, using the obtained two coordinates a1 and a2, an emission angle θ1 of the detection light with respect to the display surface, and a value H corresponding to the height of the reflected position by solving Equation (1) below established for each of the two parallel light beams, that is, $$H=|a1-a2|*\tan θ1*\tan θ2/(\tan θ1+\tan θ2) \quad (1),$$

wherein an incident angle θ2 of the reflected detection light with respect to the display surface and the value H corresponding to the height are unknown.

17. A reflection detection method, comprising:
 obliquely emitting a detection light towards an external object from an emission area, wherein the emission area is a part of a display surface;
 selectively receiving a reflected detection light, wherein the reflected detection light enters the display surface with a predetermined angle after being reflected by the external object; and
 determining a height of a portion on the external object, at which the detection light is reflected, using positional information of a light-receiving position at which the reflected detection light is received and positional information of the emission area, wherein the height is a distance to the portion from the display surface.

18. The reflection detection method according to claim 17, wherein the emission area is shifted in one direction within the display surface, wherein the emission area obliquely emits the detection light, and wherein the determination of the height further comprises:

obtaining a coordinate a2 of an incident position of the reflected detection light in the shift direction and a coordinate a1 of a position of the emission area at a time the coordinate a2 is obtained, and obtaining, using the obtained two coordinates a1 and a2, an emission angle θ1 of the detection light with respect to the display surface, an incident angle θ2 of the reflected detection light with respect to the display surface, and a value H corresponding to the height by solving Equation (1) below $$H=|a1-a2|*\tan θ1*\tan θ2/(\tan θ1+\tan θ2) \quad (1).$$

19. The reflection detection method according to claim 17, further comprising outputting as the detection light, two parallel light beams that have tilt angle components in two opposite directions within the display surface, and shifting the emission area in a direction parallel to the two opposite directions, wherein the determination of the height further comprises:

obtaining, for each of the two parallel light beams, a coordinate a2 of an incident position of the reflected detection light in the shift direction and a coordinate a1 of a position of the emission area at a time the coordinate a2 is obtained, and obtaining, using the obtained two coordinates a1 and a2, an emission angle θ1 of the detection light with respect to the display surface, and a value H corresponding to the height of the reflected position by solving Equation (1) below established for each of the two parallel light beams, that is, $$H=|a1-a2|*\tan θ1*\tan θ2/(\tan θ1+\tan θ2) \quad (1),$$

wherein an incident angle θ2 of the reflected detection light with respect to the display surface and the value H corresponding to the height are unknown.

* * * * *